(12) United States Patent
Livesley

(10) Patent No.: US 12,541,814 B2
(45) Date of Patent: *Feb. 3, 2026

(54) MEMORY MANAGEMENT FOR MULTICORE 3-D GRAPHICS RENDERING

(71) Applicant: Imagination Technologies Limited, Kings Langley (GB)

(72) Inventor: Michael John Livesley, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 365 days.

This patent is subject to a terminal disclaimer.

(21) Appl. No.: 18/125,697

(22) Filed: Mar. 23, 2023

(65) Prior Publication Data

US 2023/0334749 A1   Oct. 19, 2023

(30) Foreign Application Priority Data

Mar. 30, 2022   (GB) .................................... 2204505

(51) Int. Cl.
*G06T 1/60* (2006.01)
*G06F 9/50* (2006.01)
(Continued)

(52) U.S. Cl.
CPC ............. *G06T 1/60* (2013.01); *G06F 9/5011* (2013.01); *G06F 9/5022* (2013.01); *G06F 12/08* (2013.01);
(Continued)

(58) Field of Classification Search
None
See application file for complete search history.

(56) References Cited

U.S. PATENT DOCUMENTS 5,794,016 A   8/1998   Kelleher
8,074,224 B1   12/2011   Nordquist et al.
(Continued)

FOREIGN PATENT DOCUMENTS

CN   105261066 A   1/2016
CN   109978751 A   7/2019
(Continued)

OTHER PUBLICATIONS

Fedorov, D.G.: "A new hierarchical parallelization scheme: generalized distributed data interface (GDDI), and an application to the fragment molecular orbital method (FMO)", Journal of computational chemistry. Apr. 30, 2004;25 (6):872-80.
(Continued)

*Primary Examiner* — Jwalant Amin
(74) *Attorney, Agent, or Firm* — Potomac Law Group, PLLC; Vincent M DeLuca

(57) ABSTRACT

A multicore graphics rendering system is disclosed, comprising a plurality of cores configured to implement tile-based rendering of a stream of primitives. First cores are configured to process groups of primitives, to produce transformed geometry data. The transformed geometry data describes, for each of a plurality of tiles, the primitives processed by each first core that are present in that tile, each group being associated with a group index. The group indices define the ordering of the groups in the stream of primitives. An allocation list (ALIST) stores, for each portion of memory written to by the first cores, an indication of a part of the frame with which that portion is associated, and the latest group index of the transformed geometry data written to the portion. The ALIST is used to identify, and free, portions of memory that have been fully consumed in a partial render.

20 Claims, 11 Drawing Sheets

(51) Int. Cl.
*G06F 12/08* (2016.01)
*G06T 1/20* (2006.01)
*G06T 11/40* (2006.01)
*G06T 15/00* (2011.01)

(52) U.S. Cl.
CPC .............. *G06T 1/20* (2013.01); *G06T 11/40* (2013.01); *G06T 15/005* (2013.01)

(56) References Cited

U.S. PATENT DOCUMENTS

| | | |
|---|---|---|
| 8,330,766 B1 | 12/2012 | McAllister et al. |
| 10,275,851 B1 | 4/2019 | Zhao et al. |
| 10,733,695 B2 | 8/2020 | Andersson et al. |
| 2007/0091099 A1 | 4/2007 | Zhang et al. |
| 2007/0159488 A1 | 7/2007 | Danskin et al. |
| 2009/0307464 A1 | 12/2009 | Steinberg et al. |
| 2011/0109638 A1 | 5/2011 | Duluk, Jr. et al. |
| 2011/0292032 A1 | 12/2011 | Yang |
| 2015/0254102 A1 | 9/2015 | Ueda et al. |
| 2016/0260249 A1 | 9/2016 | Persson et al. |
| 2017/0178401 A1 | 6/2017 | Agrawal et al. |
| 2017/0236244 A1 | 8/2017 | Price et al. |
| 2017/0256016 A1 | 9/2017 | Lee et al. |
| 2018/0130253 A1 | 5/2018 | Hazel |
| 2018/0211435 A1 | 7/2018 | Nijasure et al. |
| 2018/0276876 A1 | 9/2018 | Yang et al. |
| 2018/0307490 A1 | 10/2018 | Hakura et al. |
| 2019/0355084 A1 | 11/2019 | Gierach et al. |
| 2020/0097293 A1 | 3/2020 | Havlir et al. |
| 2020/0265547 A1 | 8/2020 | Redshaw |
| 2020/0380755 A1 | 12/2020 | Howson et al. |
| 2021/0097013 A1 | 4/2021 | Saleh et al. |
| 2021/0158598 A1 | 5/2021 | Bratt et al. |
| 2021/0174575 A1 | 6/2021 | Mandal et al. |
| 2021/0241416 A1 | 8/2021 | Cerny |
| 2022/0083384 A1 | 3/2022 | Cerny |
| 2022/0319089 A1 | 10/2022 | Nemlekar et al. |
| 2024/0005444 A1 | 1/2024 | Stepuch |
| 2024/0070962 A1 | 2/2024 | Yang et al. |
| 2024/0127524 A1 | 4/2024 | Yang et al. |

FOREIGN PATENT DOCUMENTS

| | | | |
|---|---|---|---|
| CN | 112862661 A | | 5/2021 |
| EP | 1287494 A1 | | 3/2003 |
| EP | 2548171 A1 | | 1/2013 |
| EP | 3547248 A1 | | 10/2019 |
| EP | 3796263 A1 | | 3/2021 |
| EP | 3862975 A1 | | 8/2021 |
| GB | 2442266 A | | 4/2008 |
| GB | 2478660 A | | 9/2011 |
| GB | 2594764 A | | 11/2021 |
| WO | 2009/068895 A1 | | 6/2009 |

OTHER PUBLICATIONS

Ullman, S.: "Object recognition and segmentation by a fragment-based hierarchy", Trends in cognitive sciences. Feb. 1, 2007; 11 (2):58-64.

Imagination Technologies: "Tiling positive or how Vulkan maps to PowerVR GPUs"; Retrieved from the Internet: URL: https%3A%2F%2Fblog.imaginationtech.com%2Ftiling-positive-or-how-vulkan-maps-to-powervr-gpus%2F; Mar. 9, 2016; pp. 1-13.

Kayhan; "Chasing Triangles in a Tile-based Rasterizer"; Retrieved from the Internet: URL:https://tayfunkayhan.wordpress.com/2019/07/26/chasing-triangles-in-a-tile-based-rasterizer/; Jul. 29, 2019; pp. 1-18.

Yu et al; "A Credit-Based Load-Balance-Aware CTA Scheduling Optimization Scheme in GPGPU"; International Journal of Parallel Programming; vol. 44; No. 1; Aug. 22, 2014; 21 pages.

Anonymous; "Graphics—SGX543MP4"; Retrieved from the Internet: URL:https://www.psedevwiki.com/vita/Graphics; Sep. 13, 2020; pp. 1-9.

Beets; "A look at the PowerVR graphics architecture: Tilebased rendering"; Retrieved from the Internet: URL:https://blog.imaginationtech.com/a-look-at-the-powervr-graphics-architecture-tile-based-rendering/; Apr. 2, 2015; pp. 1-12.

Beets; "A look at the PowerVR graphics architecture"; Retrieved from the Internet: URL:https://blog.imaginationtech.com/the-dr-in-tbdr-deferred-rendering-in-rogue/; Jan. 28, 2016; pp. 1-13.

Beets; "Introducing Furian: the architectural changes"; Retrieved from the Internet: URL:https://blog.imaginationtech.com/introducing-furian-the-architectural-changes/; Mar. 13, 2017; pp. 1-13.

Crisu et al; "Low-Power Techniques and 2D/3D Graphics Architectures"; Report Delft University of Technology; vol. 2001-01; Jun. 26, 2001; 139 pages.

Ma; "Concepts and metrics for measurement and prediction of the execution time of GPU rendering commands"; Retrieved from the Internet: URL:https://elib.uni-stuttgart.de/bitstream/11682/3467/1/MSTR_3635.pdf; Aug. 19, 2014; pp. 1-99.

Nickolls et al; "Appendix C: Graphics and Computing GPU'S"; Computer Organization and Design: The Hardware/Software Interface; URL:http://booksite.elsevier.com/9780124077263/downloads/advance_contents_and_appendices/appendix_C.pdf ; Jan. 1, 2013; 82 pages.

Graphics—SGX543MP4; Sep. 13, 2020. XP093061510, Retrieved from the Internet: URL: https://www.psedevwiki.com/vita/Graphics) (hereinafter PSVita) (Year: 2020).

MEMORY MANAGEMENT FOR MULTICORE 3-D GRAPHICS RENDERING

BACKGROUND

In computer graphics, "rendering" is the process of converting a 3D model, describing a virtual scene, into one or more 2D images, representing a view of the scene from a specific viewpoint (or viewpoints). As this is a computationally intensive process, for typical virtual scenes, it is common to provide a hardware accelerator that is specialised in carrying out the necessary computations. This kind of hardware accelerator is known in the art as a graphics processing unit (GPU).

Different GPUs may have different hardware architectures, reflecting different strategies for carrying out the computations necessary for 3D rendering. One exemplary GPU uses a "tile-based deferred rendering" (TBDR) pipeline.

This approach separates the rendering process into two distinct stages. The first of these two stages—the geometry processing stage (or simply "geometry processing", for short)—involves processing geometry data that describes the 3-D model of the scene. The geometry data is transformed from the 3-D space into the 2-D coordinates of the image, based on the particular viewpoint to be rendered. The output of this stage is transformed geometry, which is stored in a "parameter buffer" in so-called "primitive blocks".

The fundamental operation in the geometry stage is to work out what primitive shapes fall within each tile. The primitives are most commonly triangles. These triangles join together to form objects. The triangles are described in terms of their vertices (corner points). Each vertex includes positional information (the location of the vertex) and can include additional information, for example, colour.

The geometry stage of a rendering operation begins when the GPU receives a draw call from an application driver. The draw call contains instructions for geometry processing tasks (in particular, what triangles to draw) and all of the information needed to carry out the geometry processing.

In the second stage, known as "fragment processing", the transformed geometry data is read from the parameter buffer and rasterised-meaning converted to fragments and mapped to pixels. The fragment processing stage converts the primitives into fragments through the rasterisation process. As part of this process, depth-testing is performed to determine what fragments are actually visible at each pixel (or each sample position, if there is not a one-to-one correspondence between sample positions and pixels). "Deferred rendering" refers to the fact that only when the system has determined what fragments are visible does the GPU proceed to run "fragment shader" programs on the visible fragments. The shader program retrieves texture data (containing colour information) for the relevant visible fragments. The shaded fragments are used to determine the pixel values to be displayed.

This deferred rendering approach has the benefit of avoiding running the texturing and shading process for surfaces (fragments) that will ultimately be hidden behind other fragments in the scene. Only the fragments nearest the virtual camera (i.e. viewpoint) need to be shaded.

"Tile-based" refers to the fact that the image to be rendered is subdivided into multiple rectangular blocks, or "tiles". More specifically, in the geometry processing stage, the transformed geometry can be split up, tile by tile, to create a set of tile lists indicating which primitives are present in each tile. The tiles can then be processed by the fragment shading stage substantially independently of one another. Fragment shading is performed for each individual tile, producing pixel (colour) values for the blocks of pixels in that tile.

The tile-based approach facilitates greater data locality. The set of geometry fragments in each tile is typically a small subset of the overall set of fragments. Therefore, the processing can be carried out with a much smaller memory allocation than if the whole image were to be processed in one pass.

Tiling can also facilitate parallel processing to some extent. In particular, because the texturing/shading can be performed independently for different tiles, the fragment shading for different tiles can be allocated to separate GPU cores, in a multicore architecture.

In order to reduce rendering time, it is desirable to process rendering tasks, including both geometry processing and fragment processing tasks, in parallel using a multicore GPU. In order to process a draw call in parallel, the rendering tasks contained within the draw call must be split up into smaller groups of tasks that can be processed on each core of the multicore system.

However, implementing rendering tasks in parallel creates significant new challenges because of the special nature of graphics rendering calculations. In particular, a GPU is required to respect the order in which rendering work is provided by the application driver. This is because, for certain types of graphics content, the final rendered image will depend on the order in which objects are rendered. In other words, if objects are rendered out of sequence, the final rendered image will be incorrect.

This is not a problem for a single rendering pipeline. Work will always exit the pipeline in the same order that it entered the pipeline; there is no danger of completing work out of sequence. However, in a parallel implementation, this inherent ordering is lost. When work is distributed between cores, it is generally not possible to predict accurately how long each piece of work will take each core to complete. When cores are processing, in parallel, work that was originally provided in a defined sequence, there is the possibility that the work will be finished out of the original sequence.

It would be desirable to implement rendering tasks in parallel, on a multicore GPU, in a manner that is efficient and yet also respects the requirement that primitives be rendered in the order that they were provided by the application driver. In particular, it would be desirable to do this in a way that manages the use of memory efficiently. This can help to reduce the likelihood that the system will run out of memory. In this way, it can facilitate the rendering of more complex scenes (for example, scenes containing a greater number of primitives) for a given available size of memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect, a multicore graphics rendering system is disclosed, comprising a plurality of cores configured to implement tile-based rendering of a stream of primitives. First cores are configured to process groups of primitives, to produce transformed geometry data. The transformed geometry data describes, for each of a plurality of tiles, the primitives processed by each first core that are present in that tile, each group being associated with a group index. The group indices define the ordering of the groups in the stream of primitives. An allocation list (ALIST) stores, for each portion of memory written to by the first cores, an indication of a part of the frame with which that portion is associated, and the latest group index of the transformed geometry data written to the portion. The ALIST is used to identify, and free, portions of memory that have been fully consumed in a partial render.

According to a second aspect, a multicore graphics rendering system is disclosed, comprising a plurality of cores configured to implement tile-based rendering of a stream of primitives. The graphics rendering system uses at least one virtualised memory space. A hierarchical index is provided, to index the physical memory portions associated with virtual memory portions in the at least one virtualised memory space. The portions of memory allocated for the hierarchical index are recorded in an MMU list (MLIST). The MLIST comprises a plurality of entries, each entry being associated with a respective portion of the hierarchical index, wherein each entry includes an indication of the portion of virtual memory that is indexed by that portion of the hierarchical index. The MLIST is used to identify, and free, portions of memory associated with indexing virtual memory that has been fully consumed in a partial render.

According to a third aspect, a multicore graphics rendering system is disclosed, comprising a plurality of cores configured to implement tile-based rendering of a stream of primitives. First cores are configured to process groups of primitives, to produce transformed geometry data. The graphics rendering system uses at least one virtualised memory space. At least one virtualised memory space is segmented such that the first cores are allocated respective non-overlapping virtual address ranges in the space, the virtual address ranges being associated with different entries in a top level of the index. The top level of the hierarchical index is pre-allocated, and each core is primed by providing it with said top level of the hierarchical index.

According to the first aspect, there is provided a multicore graphics rendering system, comprising a plurality of cores, configured to implement tile-based rendering of a stream of primitives,
wherein first cores of the plurality are configured to perform geometry processing work, and second cores of the plurality are configured to perform fragment processing work,
wherein each first core is configured to process groups of primitives, to produce transformed geometry data describing, for each of a plurality of tiles, the primitives processed by that first core that are present in that tile, each group being associated with a group index, the group indices defining the ordering of the groups in the stream of primitives,
the first cores being configured to store in a memory the transformed geometry data that they produce,
each second core being configured to perform fragment processing for one or more of the tiles, wherein each second core is configured to, for each tile to be processed, read from the memory the transformed geometry data produced by the first cores for that tile,
wherein one of the cores comprises an allocation manager, configured to allocate portions of memory to the first cores to store the transformed geometry data,
wherein the allocation manager maintains an allocation list, hereinafter ALIST, storing, for each portion of memory written to by the first cores, an indication of a part of the frame with which that portion is associated, and the latest group index of the transformed geometry data written to the portion,
wherein the second cores are configured to execute a partial render, comprising performing fragment processing for primitives in a renderable range of groups, the renderable range starting with a starting group and ending with an ending group, wherein, before executing the partial render, geometry processing has been completed for every group ahead of the ending group in the ordering,
wherein the allocation manager is configured to scan the ALIST to identify portions of memory that have been fully consumed by the second cores performing fragment processing,
wherein the scan comprises, for each portion of memory:
comparing the indication of the part of the frame, in the ALIST, with an indication of parts of the frame for which fragment processing has been completed; and
comparing the latest group index, in the ALIST, with the group index of the ending group, defining the end of the renderable range,
wherein the allocation manager is configured to free the portions of memory identified in the scan.

Each group consists of a contiguous series of primitives. The groups collectively contain all of the primitives in the stream. The groups may be generated by dividing the stream into groups of successive primitives.

The first cores and second cores may be the same or different cores. Thus, at least some of the first cores may also be second cores and/or at least some of the second cores may also be first cores. In other words, a given core may be configured to perform geometry processing work, or may be configured to perform fragment processing work, or may be configured to perform both geometry processing work and fragment processing work.

The graphics rendering system may be configured to implement tile-based deferred rendering.

The "portions" of memory referred to above may be pages of memory, in particular.

Optionally, the transformed geometry data produced by each first core comprises: a set of tile control lists, describing for each tile, the primitives processed by that first core that are present in that tile; a head pointer for each tile control list, wherein the head pointer points to the start of the respective tile control list; and one or more primitive blocks, containing data describing the primitives, wherein the tile control lists contain pointers to the one or more primitive blocks.

Each tile control list may include the group indices associated with the primitives described in that tile control list.

The graphics rendering system (in particular, the allocation manager) may be configured to free memory associated with portions of tile control lists and primitive block data that have been rendered in the partial render.

One of the first cores may comprise a geometry processing master unit, configured to split the stream of primitives into the groups of primitives, and assign the groups of primitives among the first cores. The geometry processing master unit may implement load balancing among the first cores. This may comprise one or both of: (i) assigning approximately equal amounts of geometry processing work to each first core; and (ii) assigning geometry processing work preferentially to first cores that have completed previously assigned geometry processing work.

Each of the first cores may comprise a geometry processing slave unit, configured to control the processing of the groups of primitives assigned to that core, to produce the respective set of tile control lists One of the second cores may comprise a fragment shading master unit, configured to assign the tiles among the second cores. The fragment shading master unit may assign tiles to the second cores in arrays of neighbouring tiles. This can facilitate greater data locality, as adjacent tiles are more likely to depend on the same primitive data than arbitrarily selected tiles. Consequently, if primitive data is cached in one of the second cores, a cache hit is more likely when that core is processing a tile that is adjacent to one that it has already processed. The arrays may be two-dimensional arrays; for example, the fragment shading master unit may assign a 2×2 array of tiles to each second core.

The fragment shading master unit may implement load balancing among the second cores. This may comprise one or both of: (i) assigning approximately equal amounts of fragment processing work to each second core; and (ii) assigning fragment processing work preferentially to second cores that have completed previously assigned fragment processing work.

Each of the second cores may comprise a fragment shading slave unit, configured to control the fragment processing for the tiles assigned to that core.

The allocation manager may be configured to scan the ALIST: (i) after completion of the partial render; and/or (ii) after completion of at least some tiles of the partial render, optionally after completion of a predetermined number of rows of tiles. (The tiles are typically arranged in an array comprising a predetermined number of rows and columns.)

In some examples, the indication of the part of the frame may comprise a macrotile mask, indicating the macrotiles with which the memory-portion is associated. The allocation manager may be configured to scan the ALIST after completion of one or more macrotiles. In particular, the allocation manager may be configured to scan the ALIST after completion of a row of macrotiles.

The allocation manager may be further configured to allocate portions of memory for storing the ALIST, wherein, following the scan, the allocation manager is optionally configured to compact the ALIST, such that ALIST entries identified in the scan are invalidated and entries other than those identified in the scan are consolidated into a consecutive set of entries.

The compacting may comprise copying an ALIST entry that was not invalidated to the memory location of an ALIST entry that was invalidated, followed by invalidating the copied ALIST entry. In particular, the non-invalidated ALIST entry may be copied to the memory location of the earliest entry in the ALIST that is invalid. These steps may be repeated for all non-contiguous ALIST entries, until the entire ALIST is stored contiguously.

The allocation manager may be further configured to, after compacting the ALIST, free any portions of memory used to store the ALIST that are no longer required following the consolidation.

The graphics rendering system may use at least one virtualised memory space, wherein each core optionally comprises a memory management unit, hereinafter MMU, configured to translate between virtual memory portions in the at least one virtualised memory space and physical memory portions of the memory. The allocation manager may be configured to allocate for the MMUs a hierarchical index, to index the physical memory portions associated with the virtual memory portions in the at least one virtualised memory space, wherein the allocation manager is configured to record the portions of memory allocated to the MMUs for the hierarchical index in an MMU list, hereinafter referred to as the MLIST, wherein the MLIST comprises a plurality of entries, each entry being associated with a respective portion of the hierarchical index, wherein each entry includes an indication of the portion of virtual memory that is indexed by that portion of the hierarchical index. The allocation manager may be configured to, after scanning the ALIST: identify, from the MLIST, the portions of memory associated with indexing virtual memory that has been fully consumed by the plurality of second cores performing fragment processing; and free the identified portions of memory.

In this way, the allocation manager can free portions of the memory that have been used to store the hierarchical index, when those portions relate to parts of the hierarchical index that are no longer required (because the associated fragment processing has been completed).

When scanning the ALIST, the allocation manager may identify one or more ranges of virtual memory that have been fully consumed by the fragment processing. The allocation manager may be configured to identify (from the MLIST) the portions of memory to free by comparing, for each entry in the MLIST, the identified one or more ranges with the indication of the portion of the virtual memory associated with that MLIST entry.

The allocation manager may be configured to, after freeing the identified portions of memory, compact the MLIST, such that MLIST entries corresponding to the freed portions of memory are invalidated, and the remaining MLIST entries are consolidated into a consecutive set of entries.

The compacting may comprise copying one of the remaining MLIST entries (that was not invalidated) to the memory location of an MLIST entry that was invalidated, followed by invalidating the copied MLIST entry. In particular, the non-invalidated MLIST entry may be copied to the memory location of the earliest entry in the MLIST that is invalid. These steps may be repeated for all non-contiguous MLIST entries, until the entire MLIST is stored contiguously.

The hierarchical index may include a top level and one or more additional levels, wherein the memory for storing the top level of the hierarchical index is optionally allocated statically, and wherein the memory for storing the one or more additional levels of the hierarchical index is optionally allocated dynamically.

The MLIST entries may refer to portions of the one or more additional levels of the hierarchical index.

The amount of memory needed to store the top level may be predictable in advance, because this depends on the total size of memory to be indexed, and the granularity with which the top level indexes the memory. This may be an acceptable amount of memory to allocate statically, since the top level of the hierarchy has the coarsest granularity. Subsequent levels of the hierarchical index would require multiples of this amount of memory, if they were to be allocated statically. Using dynamically allocated memory to store these subsequent levels helps to reduce unnecessary memory consumption. The size (in memory) of the one or more additional levels of the hierarchical index can grow approximately in proportion to the number of virtual memory portions (e.g. pages) that are dynamically allocated.

Each level of the hierarchical index contains an array of entries. At the top level of the index, the entries may be initialised with null values. When memory is allocated (dynamically) for a part of the at least one additional level of the hierarchical index, a pointer to the allocated memory may be written to the associated entry at the top level.

Each MLIST entry may contain any one or any combination of two or more of: an indication of the virtualised memory space to which the memory portion referenced in the MLIST entry pertains; for segmented virtualised spaces containing a plurality of segments, an indication of the segment to which the memory portion referenced in the MLIST entry pertains; an indication of the level of the hierarchical index structure to which the memory portion referenced in the MLIST entry pertains.

This information may be used by the allocation manager to identify portions of the index structure that can be freed after a partial render (as well as corresponding MLIST entries that can be invalidated, accordingly).

The allocation manager may be configured to segment the virtualised memory space such that the first cores are allocated respective non-overlapping virtual address ranges in the space, the virtual address ranges being associated with different entries in a top level of the hierarchical index. The allocation manager may be configured to, before geometry processing for a frame begins, pre-allocate the top level of the hierarchical index, and prime each MMU by providing it with said top level of the hierarchical index.

Also provided according to the first aspect is a method for tile-based rendering of a stream of primitives in a multicore graphics rendering system, comprising a plurality of cores, the method comprising:
 using first cores of the plurality, performing geometry processing work; and
 using second cores of the plurality, performing fragment processing work,
 wherein the geometry processing work comprises processing, by each first core, groups of primitives, to produce transformed geometry data describing, for each of a plurality of tiles, the primitives processed by that first core that are present in that tile, each group being associated with a group index, the group indices defining the ordering of the groups in the stream of primitives,
 the method further comprising storing, by the first cores, in a memory, the transformed geometry data that they produce,
 wherein the fragment processing work comprises, for each second core, performing fragment processing for one or more of the tiles, comprising, for each tile to be processed, reading from the memory the transformed geometry data produced by the first cores for that tile,
 the method comprising:
 allocating portions of memory to the first cores to store the transformed geometry data,
 maintaining an allocation list, hereinafter ALIST, storing, for each portion of memory written to by the first cores, an indication of a part of the frame with which that portion is associated, and the latest group index of the transformed geometry data written to the portion,
 executing, by the second cores, a partial render, comprising performing fragment processing for primitives in a renderable range of groups, the renderable range starting with a starting group and ending with an ending group, wherein, before executing the partial render, geometry processing has been completed for every group ahead of the ending group in the ordering,
 scanning the ALIST to identify portions of memory that have been fully consumed by the second cores performing fragment processing,
 wherein the scanning comprises, for each portion of memory:
  comparing the indication of the part of the frame, in the ALIST, with an indication of parts of the frame for which fragment processing has been completed; and
  comparing the latest group index, in the ALIST, with the group index of the ending group, defining the end of the renderable range, and
 freeing the portions of memory identified in the scanning.

The transformed geometry data produced by each first core optionally comprises: a set of tile control lists, describing for each tile, the primitives processed by that first core that are present in that tile; a head pointer for each tile control list, wherein the head pointer points to the start of the respective tile control list; and one or more primitive blocks, containing data describing the primitives, wherein the tile control lists contain pointers to the one or more primitive blocks.

The scanning of the ALIST is optionally performed: (i) after completion of the partial render; and/or (ii) after completion of at least some tiles of the partial render, optionally after completion of a predetermined number of rows of tiles.

The method may further comprise: allocating portions of memory for storing the ALIST; and following the scanning, compacting the ALIST, such that ALIST entries identified in the scan are invalidated and entries other than those identified in the scan are consolidated into a consecutive set of entries.

The method may further comprise, after compacting the ALIST, freeing any portions of memory used to store the ALIST that are no longer required following the consolidation.

The graphics rendering system may use at least one virtualised memory space, and the method may comprise translating between virtual memory portions in the at least one virtualised memory space and physical memory portions of the memory, the method optionally further comprising: allocating a hierarchical index, to index the physical memory portions associated with the virtual memory portions in the at least one virtualised memory space, recording the portions of memory allocated for the hierarchical index in an MMU list, hereinafter referred to as the MLIST, wherein the MLIST comprises a plurality of entries, each entry being associated with a respective portion of the hierarchical index, wherein each entry includes an indication of the portion of virtual memory that is indexed by that portion of the hierarchical index, wherein the method optionally comprises, after scanning the ALIST: identifying, from the MLIST, the portions of memory associated with indexing virtual memory that has been fully consumed by the plurality of second cores performing fragment processing; and freeing the identified portions of memory.

The method may further comprise, after freeing the identified portions of memory, compacting the MLIST, such that MLIST entries corresponding to the freed portions of memory are invalidated, and the remaining MLIST entries are consolidated into a consecutive set of entries.

The hierarchical index may include a top level and one or more additional levels, wherein the memory for storing the top level of the hierarchical index is optionally allocated statically, and wherein the memory for storing the one or more additional levels of the hierarchical index is optionally allocated dynamically.

Each MLIST entry may contain any one or any combination of two or more of: an indication of the virtualised memory space to which the memory portion referenced in the MLIST entry pertains; for segmented virtualised spaces containing a plurality of segments, an indication of the segment to which the memory portion referenced in the MLIST entry pertains; an indication of the level of the hierarchical index structure to which the memory portion referenced in the MLIST entry pertains.

The method may further comprise segmenting the virtualised memory space such that the first cores are allocated respective non-overlapping virtual address ranges in the space, the virtual address ranges being associated with different entries in a top level of the hierarchical index, and, before geometry processing for a frame begins, optionally pre-allocating the top level of the hierarchical index, and priming each core by providing it with said top level of the hierarchical index.

According to the second aspect, there is provided a multicore graphics rendering system, comprising a plurality of cores, configured to implement tile-based rendering of a stream of primitives,
  wherein first cores of the plurality are configured to perform geometry processing work, and second cores of the plurality are configured to perform fragment processing work,
  wherein each first core is configured to process groups of primitives, to produce transformed geometry data describing, for each of a plurality of tiles, the primitives processed by that first core that are present in that tile, each group being associated with a group index, the group indices defining the ordering of the groups in the stream of primitives,
  the first cores being configured to store in a memory the transformed geometry data that they produce,
  each second core being configured to perform fragment processing for one or more of the tiles, wherein each second core is configured to, for each tile to be processed, read from the memory the transformed geometry data produced by the first cores for that tile,
  wherein one of the cores comprises an allocation manager, configured to allocate portions of memory to the first cores to store the transformed geometry data,
  wherein the second cores are configured to execute a partial render, comprising performing fragment processing for primitives in a renderable range of groups, the renderable range starting with a starting group and ending with an ending group, wherein, before executing the partial render, geometry processing has been completed for every group ahead of the ending group in the ordering,
  wherein the graphics rendering system uses at least one virtualised memory space, wherein each core comprises a memory management unit, hereinafter MMU, configured to translate between virtual memory portions in the at least one virtualised memory space and physical memory portions of the memory,
  wherein the allocation manager is configured to allocate for the MMUs a hierarchical index to index the physical memory portions associated with the virtual memory portions in the at least one virtualised memory space,
  wherein the allocation manager is configured to record the portions of memory allocated to the MMUs for the hierarchical index in an MMU list, hereinafter referred to as the MLIST,
  wherein the MLIST comprises a plurality of entries, each entry being associated with a respective portion of the hierarchical index, wherein each entry includes an indication of the portion of virtual memory that is indexed by that portion of the hierarchical index,
  wherein the allocation manager is configured to, after a partial render:
    identify, from the MLIST, the portions of memory associated with indexing virtual memory that has been fully consumed by the plurality of second cores performing fragment processing; and
    free the identified portions of memory.

The allocation manager may be configured to, after freeing the identified portions of memory, compact the MLIST, such that MLIST entries corresponding to the freed portions of memory are invalidated, and the remaining MLIST entries are consolidated into a consecutive set of entries.

The hierarchical index may include a top level and one or more additional levels, wherein the memory for storing the top level of the hierarchical index is optionally allocated statically, and wherein the memory for storing the one or more additional levels of the hierarchical index is optionally allocated dynamically.

The allocation manager may be configured to segment the virtualised memory space such that the first cores are allocated respective non-overlapping virtual address ranges in the space, the virtual address ranges being associated with different entries in a top level of the hierarchical index, wherein the allocation manager is optionally configured to, before geometry processing for a frame begins, pre-allocate the top level of the hierarchical index, and prime each MMU by providing it with said top level of the hierarchical index.

Also provided according to the second aspect is a method for tile-based rendering of a stream of primitives in a multicore graphics rendering system, comprising a plurality of cores, the method comprising:
  using first cores of the plurality, performing geometry processing work; and
  using second cores of the plurality, performing fragment processing work,
  wherein the geometry processing work comprises processing, by each first core, groups of primitives, to produce transformed geometry data describing, for each of a plurality of tiles, the primitives processed by that first core that are present in that tile, each group being associated with a group index, the group indices defining the ordering of the groups in the stream of primitives,
  the method further comprising storing, by the first cores, in a memory, the transformed geometry data that they produce,
  wherein the fragment processing work comprises, for each second core, performing fragment processing for one or more of the tiles, comprising, for each tile to be processed, reading from the memory the transformed geometry data produced by the first cores for that tile,
  the method comprising allocating portions of memory to the first cores to store the transformed geometry data,
  the method comprising executing, by the second cores, a partial render, comprising performing fragment processing for primitives in a renderable range of groups, the renderable range starting with a starting group and ending with an ending group, wherein, before executing the partial render, geometry processing has been completed for every group ahead of the ending group in the ordering,
  wherein the graphics rendering system uses at least one virtualised memory space, and the method comprises translating between virtual memory portions in the at least one virtualised memory space and physical memory portions of the memory,
the method further comprising:
allocating a hierarchical index to index the physical memory portions associated with the virtual memory portions in the at least one virtualised memory space,
recording the portions of memory allocated for the hierarchical index in an MMU list, hereinafter referred to as the MLIST,
wherein the MLIST comprises a plurality of entries, each entry being associated with a respective portion of the hierarchical index, wherein each entry includes an indication of the portion of virtual memory that is indexed by that portion of the hierarchical index,
wherein the method comprises, after a partial render:
identifying, from the MLIST, the portions of memory associated with indexing virtual memory that has been fully consumed by the plurality of second cores performing fragment processing; and
freeing the identified portions of memory.

The method may further comprise, after freeing the identified portions of memory, compacting the MLIST, such that MLIST entries corresponding to the freed portions of memory are invalidated, and the remaining MLIST entries are consolidated into a consecutive set of entries.

The hierarchical index may include a top level and one or more additional levels, wherein the memory for storing the top level of the hierarchical index is allocated statically, and wherein the memory for storing the one or more additional levels of the hierarchical index is allocated dynamically.

The method may further comprising segmenting the virtualised memory space such that the first cores are allocated respective non-overlapping virtual address ranges in the space, the virtual address ranges being associated with different entries in a top level of the hierarchical index, and, before geometry processing for a frame begins, optionally pre-allocating the top level of the hierarchical index, and priming each core by providing it with said top level of the hierarchical index.

According to the third aspect, there is provided a multi-core graphics rendering system, comprising a plurality of cores, configured to implement tile-based rendering of a stream of primitives,
wherein first cores of the plurality are configured to perform geometry processing work, and second cores of the plurality are configured to perform fragment processing work,
wherein each first core is configured to process groups of primitives, to produce transformed geometry data describing, for each of a plurality of tiles, the primitives processed by that first core that are present in that tile, each group being associated with a group index, the group indices defining the ordering of the groups in the stream of primitives,
the first cores being configured to store in a memory the transformed geometry data that they produce,
each second core being configured to perform fragment processing for one or more of the tiles, wherein each second core is configured to, for each tile to be processed, read from the memory the transformed geometry data produced by the first cores for that tile,
wherein one of the cores comprises an allocation manager, configured to allocate portions of memory to the first cores to store the transformed geometry data,
wherein the graphics rendering system uses at least one virtualised memory space, wherein each core comprises a memory management unit, hereinafter MMU, configured to translate between virtual memory portions in the at least one virtualised memory space and physical memory portions of the memory,
wherein the allocation manager is configured to allocate for the MMUs a hierarchical index, to index the physical memory portions associated with the virtual memory portions in the at least one virtualised memory space,
wherein the allocation manager is configured to segment the virtualised memory space such that the first cores are allocated respective non-overlapping virtual address ranges in the space, the virtual address ranges being associated with different entries in a top level of the index,
wherein the allocation manager is configured to, before geometry processing for a frame begins, pre-allocate the top level of the hierarchical index, and prime each MMU by providing it with said top level of the hierarchical index.

The transformed geometry data produced by each first core optionally comprises: a set of tile control lists, describing for each tile, the primitives processed by that first core that are present in that tile; a head pointer for each tile control list, wherein the head pointer points to the start of the respective tile control list; and one or more primitive blocks, containing data describing the primitives, wherein the tile control lists optionally contain pointers to the one or more primitive blocks.

The allocation manager may maintain an allocation list, hereinafter ALIST, storing, for each portion of memory written to by the first cores, an indication of a part of the frame with which that portion is associated, and the latest group index of the transformed geometry data written to the portion, wherein the second cores are configured to execute a partial render, comprising performing fragment processing for primitives in a renderable range of groups, the renderable range starting with a starting group and ending with an ending group, wherein, before executing the partial render, geometry processing has been completed for every group ahead of the ending group in the ordering, wherein the allocation manager is optionally configured to scan the ALIST to identify portions of memory that have been fully consumed by the second cores performing fragment processing, wherein the scan comprises, for each portion of memory: comparing the indication of the part of the frame, in the ALIST, with an indication of parts of the frame for which fragment processing has been completed; and comparing the latest group index, in the ALIST, with the group index of the ending group, defining the end of the renderable range, wherein the allocation manager is configured to free the portions of memory identified in the scan.

The allocation manager may be configured to scan the ALIST: (i) after completion of the partial render; and/or (ii) after completion of at least some tiles of the partial render, optionally after completion of a predetermined number of rows of tiles.

The allocation manager may be further configured to allocate portions of memory for storing the ALIST, wherein, following the scan, the allocation manager is optionally configured to compact the ALIST, such that ALIST entries identified in the scan are invalidated and entries other than those identified in the scan are consolidated into a consecutive set of entries.

The allocation manager may be further configured to, after compacting the ALIST, free any portions of memory used to store the ALIST that are no longer required following the consolidation.

The allocation manager may be configured to record the portions of memory allocated to the MMUs for the hierarchical index in an MMU list, hereinafter referred to as the MLIST, wherein the MLIST comprises a plurality of entries, each entry being associated with a respective portion of the hierarchical index, wherein each entry includes an indication of the portion of virtual memory that is indexed by that portion of the hierarchical index, wherein the allocation manager is optionally configured to, after scanning the ALIST: identify, from the MLIST, the portions of memory associated with indexing virtual memory that has been fully consumed by the plurality of second cores performing fragment processing; and free the identified portions of memory.

The allocation manager may be configured to, after freeing the identified portions of memory, compact the MLIST, such that MLIST entries corresponding to the freed portions of memory are invalidated, and the remaining MLIST entries are consolidated into a consecutive set of entries.

Each MLIST entry may contain any one or any combination of two or more of: an indication of the virtualised memory space to which the memory portion referenced in the MLIST entry pertains; for segmented virtualised spaces containing a plurality of segments, an indication of the segment to which the memory portion referenced in the MLIST entry pertains; and an indication of the level of the hierarchical index structure to which the memory portion referenced in the MLIST entry pertains.

The hierarchical index may include a top level and one or more additional levels, wherein the memory for storing the top level of the hierarchical index is optionally allocated statically, and wherein the memory for storing the one or more additional levels of the hierarchical index is optionally allocated dynamically.

Also according to the third aspect, there is provided a method for tile-based rendering of a stream of primitives in a multicore graphics rendering system, comprising a plurality of cores, the method comprising:
  using first cores of the plurality, performing geometry processing work; and
  using second cores of the plurality, performing fragment processing work,
  wherein the geometry processing work comprises processing, by each first core, groups of primitives, to produce transformed geometry data describing, for each of a plurality of tiles, the primitives processed by that first core that are present in that tile, each group being associated with a group index, the group indices defining the ordering of the groups in the stream of primitives,
  the method further comprising storing, by the first cores, in a memory, the transformed geometry data that they produce,
  wherein the fragment processing work comprises, for each second core, performing fragment processing for one or more of the tiles, comprising, for each tile to be processed, reading from the memory the transformed geometry data produced by the first cores for that tile,
  the method comprising allocating portions of memory to the first cores to store the transformed geometry data,
  wherein the graphics rendering system uses at least one virtualised memory space, and the method comprises translating between virtual memory portions in the at least one virtualised memory space and physical memory portions of the memory,
  the method further comprising:
    allocating a hierarchical index to index the physical memory portions associated with the virtual memory portions in the at least one virtualised memory space,
    segmenting the virtualised memory space such that the first cores are allocated respective non-overlapping virtual address ranges in the space, the virtual address ranges being associated with different entries in a top level of the hierarchical index,
    and, before geometry processing for a frame begins, pre-allocating the top level of the hierarchical index, and priming each core by providing it with said top level of the hierarchical index.

The transformed geometry data produced by each first core optionally comprises one or more of: a set of tile control lists, describing, for each tile, the primitives processed by that first core that are present in that tile; a head pointer for each tile control list, wherein the head pointer points to the start of the respective tile control list; and one or more primitive blocks, containing data describing the primitives, wherein the tile control lists contain pointers to the one or more primitive blocks.

The method may comprise: maintaining an allocation list, hereinafter ALIST, storing, for each portion of memory written to by the first cores, an indication of a part of the frame with which that portion is associated, and the latest group index of the transformed geometry data written to the portion, executing, by the second cores, a partial render, comprising performing fragment processing for primitives in a renderable range of groups, the renderable range starting with a starting group and ending with an ending group, wherein, before executing the partial render, geometry processing has been completed for every group ahead of the ending group in the ordering, scanning the ALIST to identify portions of memory that have been fully consumed by the second cores performing fragment processing, wherein the scanning optionally comprises, for each portion of memory: comparing the indication of the part of the frame, in the ALIST, with an indication of parts of the frame for which fragment processing has been completed; and comparing the latest group index, in the ALIST, with the group index of the ending group, defining the end of the renderable range, and freeing the portions of memory identified in the scanning.

The scanning of the ALIST may be performed: (i) after completion of the partial render; and/or (ii) after completion of at least some tiles of the partial render, optionally after completion of a predetermined number of rows of tiles.

The method may further comprise: allocating portions of memory for storing the ALIST; and following the scanning, optionally compacting the ALIST, such that ALIST entries identified in the scan are invalidated and entries other than those identified in the scan are consolidated into a consecutive set of entries.

The method may further comprise, after compacting the ALIST, freeing any portions of memory used to store the ALIST that are no longer required following the consolidation.

The method may further comprise: recording the portions of memory allocated for the hierarchical index in an MMU list, hereinafter referred to as the MLIST, wherein the MLIST comprises a plurality of entries, each entry being associated with a respective portion of the hierarchical index, wherein each entry includes an indication of the portion of virtual memory that is indexed by that portion of the hierarchical index, wherein the method optionally comprises, after a partial render: identifying, from the MLIST, the portions of memory associated with indexing virtual memory that has been fully consumed by the plurality of second cores performing fragment processing; and freeing the identified portions of memory.

The method may further comprise, after freeing the identified portions of memory, compacting the MLIST, such that MLIST entries corresponding to the freed portions of memory are invalidated, and the remaining MLIST entries are consolidated into a consecutive set of entries.

Each MLIST entry may contain any one or any combination of two or more of: an indication of the virtualised memory space to which the memory portion referenced in the MLIST entry pertains; for segmented virtualised spaces containing a plurality of segments, an indication of the segment to which the memory portion referenced in the MLIST entry pertains; and an indication of the level of the hierarchical index structure to which the memory portion referenced in the MLIST entry pertains.

The hierarchical index includes a top level and one or more additional levels, wherein the memory for storing the top level of the hierarchical index is optionally allocated statically, and wherein the memory for storing the one or more additional levels of the hierarchical index is optionally allocated dynamically.

Still further provided is a graphics processing system comprising a core or graphics rendering system as summarised above, and/or configured to perform a method as summarised above. The graphics processing system may be embodied in hardware on an integrated circuit.

Also provided is a method of manufacturing, using an integrated circuit manufacturing system, a graphics processing system as summarised above.

Also provided is a method of manufacturing, using an integrated circuit manufacturing system, a graphics processing system as summarised above, the method comprising: processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

Further provided is computer readable code configured to cause a method as summarised above to be performed when the code is run. The computer readable code may be configured to control a graphics processing system as summarised above to perform the method when the code is run on the graphics processing system. Also provided is a computer readable storage medium (optionally non-transitory) having encoded thereon the computer readable code.

Also provided is an integrated circuit definition dataset that, when processed in an integrated circuit manufacturing system, configures the integrated circuit manufacturing system to manufacture a graphics processing system as summarised above.

Also provided is a computer readable storage medium (optionally non-transitory) having stored thereon a computer readable description of a graphics processing system as summarised above that, when processed in an integrated circuit manufacturing system, causes the integrated circuit manufacturing system to manufacture an integrated circuit embodying the graphics processing system.

Also provided is a computer readable storage medium (optionally non-transitory) having stored thereon a computer readable description of a graphics processing system as summarised above which, when processed in an integrated circuit manufacturing system, causes the integrated circuit manufacturing system to: process, using a layout processing system, the computer readable description of the graphics processing system so as to generate a circuit layout description of an integrated circuit embodying the graphics processing system; and manufacture, using an integrated circuit generation system, the graphics processing system according to the circuit layout description.

Further provided is an integrated circuit manufacturing system configured to manufacture a graphics processing system as summarised above.

Also provided is an integrated circuit manufacturing system comprising: a computer readable storage medium (optionally non-transitory) having stored thereon a computer readable description of a graphics processing system as summarised above; a layout processing system configured to process the computer readable description so as to generate a circuit layout description of an integrated circuit embodying the graphics processing system; and an integrated circuit generation system configured to manufacture the graphics processing system according to the circuit layout description.

The layout processing system may be configured to determine positional information for logical components of a circuit derived from the integrated circuit description so as to generate a circuit layout description of an integrated circuit embodying the graphics processing system.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
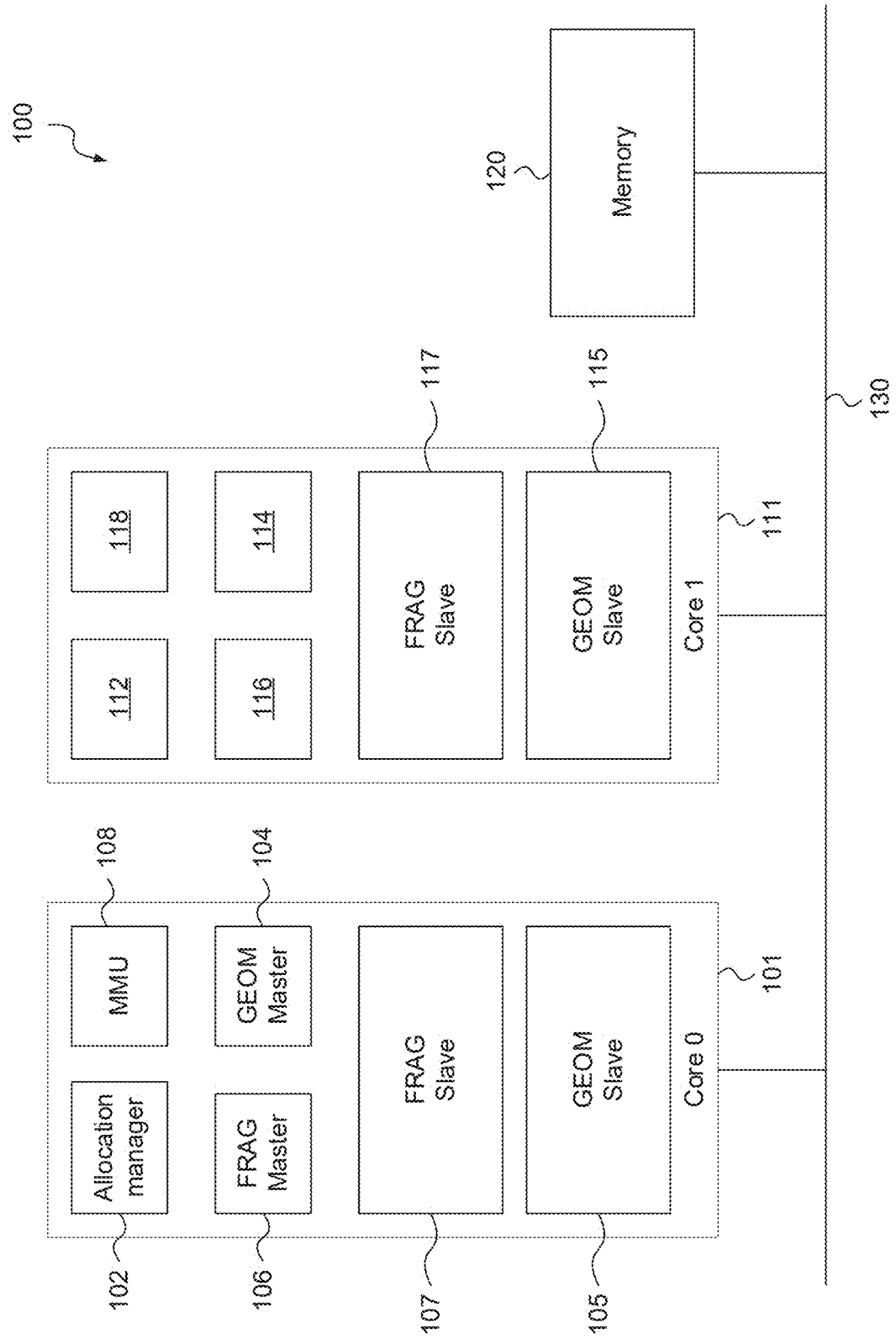
FIG. 1 is a block diagram illustrating a multicore graphics rendering system according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

According to one exemplary architecture, an input geometry stream, comprising primitives, is broken up into pieces of work for parallel processing using "pipeline interleave markers" (PIMs). These are group indices that are used to tag each piece of geometry work (that is, each group of primitives) according to its position in the original stream provided by the application driver. The PIMs will be used in the fragment shading stage to process the primitives in the correct order. It is convenient to refer to each piece of work (that is, group of primitives) as simply a "PIM", since each piece corresponds uniquely to one marker. The different PIMs can be allocated to different cores, which then carry out the geometry processing work for the different PIMs independently. Geometry processing of PIMs by a given core produces a set of tile control lists—one tile control list per tile.

According to one exemplary implementation, the PIM numbers are integers, which are assigned to successive groups in increasing numerical order (0, 1, 2, 3, . . . ). However, the bit depth of the integers is fixed and they wrap when they reach the maximum value that can be represented. For example, if the PIM number were to be defined as an 8-bit value, the PIM numbers would wrap at 255 ($=2^8-1$), such that the sequence would be 254, 255, 0, 1, 2, etc. For this reason, a later group in the sequence is not always associated with a higher PIM number (group index). It should be understood that the assignment of PIM numbers in increasing order is merely exemplary. The PIM numbers could instead be assigned to successive groups in decreasing order—for example: 255, 254, 254 . . . , etc., wrapping at zero.

The tile control list for a given tile written by a given core contains PIM markers which are used to stitch together the PIM sections from multiple tile control lists for the same tile (one from each core) into a combined control stream in PIM order. Each update to a control stream for a tile contains a link to a primitive block structure which contains more detailed information about the primitives, in terms of their 3D space vertices, and other information required during fragment processing such as uniform and texture values, and state for fixed function processing units.

Fragment shading is also implemented in parallel, typically by allocating different tiles to different cores. Note that this division of labour is different from the division of labour in the geometry processing stage. In geometry processing, work is distributed among cores in the order it is provided by the driver. It is not yet possible to divide work tile-by-tile at this stage, because the geometry processing needs to be carried out first, in order to determine which primitives will be present in which tiles.

All of the cores have access to a shared memory, from which they read input data and write output data. The tile control lists produced by the cores during geometry processing form the input for the fragment processing stage. A core performing fragment processing for a given tile therefore needs to be able to find and stitch together the relevant tile control lists (and associated primitive block structures) produced by the respective cores that did the geometry processing work.

In the exemplary architecture, memory is allocated to geometry processing work by an allocation manager. This may also be referred to as a "parameter management" (PM) master unit—so called because it allocates the memory for the parameter buffer. The PM master has a certain free pool of memory that it can allocate to geometry work being performed by different cores. The cores use the allocated memory for writing of tile control lists and primitive blocks. The maximum size of the free pool will depend on the specification of the particular graphics processing system in question, but it is inevitably finite. In general, it is not possible to predict, before doing the geometry processing, how much memory will be needed to contain the tile control lists and linked primitive block structures associated with a given PIM. This is true even if each PIM contains the same number of primitives. Factors affecting the memory requirements of a PIM may include the coverage of the primitives in tiles, and the complexity of the primitives (in particular, the data associated with each vertex). In order to adapt to these variable storage requirements, it may be advantageous to dynamically allocate the majority of the memory used to store the results of geometry processing.

Problems can arise as the remaining size of the free pool that can be allocated by the allocation manager dwindles. In the worst case, the graphics processing system (e.g. a GPU) can reach an unrecoverable deadlock state. This problem has its origins in the tension between the parallel processing and the externally imposed constraint on the sequence of rendering operations.

The problem is most easily understood by reference to an example. In a dual core system, let us assume that geometry processing for PIM0, PIM2, PIM5 and PIM6 has been allocated to Core 0, and geometry processing for PIM1, PIM3 and PIM4 has been allocated to Core 1. Each core processes each PIM independently, producing a separate tile control list per tile.

Each tile control list written by a core for each tile includes PIM markers. These are used to stitch together the PIM sections from multiple tile control lists for the same tile (one from each core) into a master control stream in PIM order, with all the PIM information removed. Each update to a tile control list for a tile contains a link to a primitive block structure, which contains more detailed information about the primitives in terms of their 3D space vertices, and other information required during fragment processing such as uniform and texture values, and state for fixed function processing units. For completeness, it is noted that primitive blocks may contain primitives for different tiles. A mask in the tile control list may be used to indicate which of the primitives in the primitive block belong to the "current" tile. Each tile control list therefore identifies primitives associated with a tile within the primitive block structures in the parameter buffer.

For the fragment shading work, each tile will be allocated to one of the two cores. To process the fragment shading for a given tile, the core (specifically, a fragment shading slave unit within the core) will stitch together two tile control lists-one that was produced by Core 0 and the other that was produced by Core 1. The PIM markers are used to preserve the correct ordering, in this stitching process.

Consider now what might happen if geometry processing work is completed out of sequence. For example, assume that Core 1 has processed PIM1 and is in the middle of processing PIM3. Meanwhile, Core 0 has completed all of its geometry processing work. This means that the parameter buffer contains tile control lists for PIM0, PIM1, PIM2, PIM5 and PIM6 (as well as a partially completed tile control list for PIM3). Let us assume that the free pool starts to run out as Core 1 continues its processing of PIM3.

One way to recover memory used in the parameter buffer is to perform a "partial render", in which the primitives processed so far are submitted for fragment processing. Once the relevant portions of memory have been read by the cores conducting fragment processing, these portions can be freed, so that they can be reallocated by the allocation manager for more geometry processing work.

In our example above, the partial render can include PIM0, PIM1, PIM2 and the part of PIM3 whose geometry processing has been completed so far. (Note that the sequence of primitives is preserved within each PIM; therefore, partial rendering of a PIM is possible.) The memory allocated to the rendered PIMs can be freed, and reallocated. Note that PIM5-PIM6 cannot be rendered, because this would break the ordering-constraint-fragment processing for these PIMs must be delayed until after fragment processing for PIM3 (and PIM 4) has been completed. This means that the memory allocated in the parameter buffer for PIM5-PIM6 cannot be freed and reused.

The need to support partial rendering poses additional challenges for various aspects of the system. Examples according to the present disclosure seek to address some of these challenges. In order to understand these challenges, it is useful to first consider an exemplary architecture for a single core graphics rendering system, according to a comparative example.

Single Core Graphics Rendering System

According to one exemplary tile-based implementation, geometry processing produces three types of data: head pointers (also referred to as "region headers"), tile control lists, and primitive blocks. The head pointers point to the start of the tile control lists. The tile control lists contain pointers to primitive blocks, which contain the actual parameter data of the transformed geometry, to be used for fragment shading.

The head pointers can be written to statically allocated memory. The amount of space needed is defined by the number of tiles (multiplied by the number of cores doing geometry processing). The memory for storing the tile control lists and primitive blocks is allocated dynamically from one or more free stacks by a parameter manager (PM). The amount of memory needed to store the tile control lists and primitive blocks is not predictable in advance, because it depends on the particulars of the scene being rendered.

The available pool of memory is a finite resource and it would be desirable to use it as efficiently as possible. This will help to avoid situations in which the lack of memory becomes the limiting factor for the continuation of the geometry processing.

The data written to memory in the geometry processing phase is consumed in the fragment shading phase. In a pipelined implementation, geometry processing for one frame may begin while fragment shading for a preceding frame is ongoing. This means that geometry data from more than one frame may need to be stored in the memory at the same time. One way of using memory capacity efficiently is to free memory as soon as possible after the data stored in it has been consumed in the fragment shading phase.

According to the exemplary single core architecture of the comparative example, the allocation manager creates virtualised spaces in memory for use by the cores writing and reading the geometry data. When a new portion (for example, page) of memory is requested by a core doing geometry processing, the allocation manager allocates physical memory from the free stack and associates it with a virtual address pointing to a virtual page of memory. The mapping from the virtual address to the physical memory is stored in a memory management unit (MMU). When a core requests to read/write from/to a virtual address, the MMU translates that address to the correct physical address in the memory.

When a core doing geometry processing work has finished writing to a given virtual page, it notifies the allocation manager. This can happen either because the virtual page is full or because core has finished its geometry processing work midway through the page. The allocation manager keeps track of these "closed" pages in a record called the allocation list (ALIST). Each entry in the ALIST comprises the address of a virtual page, and a mask. The mask indicates what part(s) of the frame the geometry data in this page relates to. In the present example, the mask is a macrotile mask, which indicates parts of the frame by reference to one or more macrotiles. The macrotiles are defined as a 4×4 grid of 16 macrotiles, each covering $\frac{1}{16}$th of the frame. Therefore, the macrotile mask is a 16-bit value. The mask is useful for recycling memory, as fragment processing proceeds.

The ALIST is allocated dynamically by the allocation manager. The allocation manager maintains a tail pointer to the end of the ALIST, which delimits its current size. When the tail needs to go beyond the end of a virtual page, the allocation manager allocates a new virtual page from a virtualised space that is reserved for the ALIST.

In addition to the ALIST, an index structure is used by the MMU to store the mapping from virtual to physical memory addresses/pages, for each virtual space. According to the present exemplary implementation, each index has a hierarchical structure with three levels: at the top level is a page catalogue (PC) page; this points to one or more page directory (PD) pages; and these point in turn to one or more page table (PT) pages. (In other implementations, the index structure may have a different number of levels—in general, the number of levels depends on the bit depth of the entries and the number of distinct physical memory addresses that need to be indexed.)

The memory needed for the index structure is dynamically allocated by the allocation manager to the MMU. The addresses of each of the index pages (one PC page and potentially many PD and PT pages, for each virtualised space) are stored in a further memory structure, called the MMU list or "MLIST". The extent of the MLIST is defined by a base pointer (pointing to the start of the list) and a tail pointer (pointing to the end). In the present exemplary implementation, there is a single MLIST, which keeps track of the memory used for indexing in all of the virtual spaces.

A separate index structure is created for each of the virtualised memory spaces in use. There is one space for the tile control lists, and another space for the primitive blocks. There is another space for indexing the memory allocated for storing the ALIST (which is also dynamically allocated by the allocation manager).

As fragment processing proceeds, the system keeps track of the macrotiles for which processing has finished. When one or more additional macro tiles have been completed, the allocation manager scans the ALIST, to check if any memory can now be freed. This is done by comparing the macrotile mask of each entry in the ALIST with the currently completed macrotiles. For a given entry in the ALIST, if at least the set of macrotiles indicated in the mask have been completed, then the associated memory is no longer needed and can be freed. In this case, the allocation manager invalidates the entry in the ALIST, and reads the virtual page in the MMU, which responds with the associated physical page or pages, which can then be returned to the free stack. Here, it is noted that, in any virtualised space, the mapping from virtual pages to physical pages need not be one to one. In the present exemplary implementation, one virtual page maps to four physical pages of memory.

The regularity with which the ALIST is scanned for reclaimable memory may depend on a geometric pattern in which the tiles or macrotiles are fragment-processed. In one example, tiles may be processed in raster scan order. In another example, tiles may be processed in a modified raster scan order defined by stepping between adjacent tiles by repeating the following sequence of moves: {down, right, up, right}.

When processing the last row of tiles in a row of macrotiles-especially with a conventional raster-scan pattern-four macrotiles will be completed in quick succession. When using such a pattern, a scan of the ALIST may be performed after completing a row of macrotiles, rather than after completing each macrotile. This will tend to increase the number of ALIST entries that can be freed in a single scan.

In the single-core system of the present comparative example, when all of the macrotiles have been fragment-processed, all of the virtual pages referenced in the ALIST can be freed. The memory used to store the ALIST itself can also be freed. The allocation manager starts with the tail pointer value and, stepping one virtual page at a time, uses the MMU to translate the virtual addresses stored in the ALIST to physical memory pages, and frees the physical memory back to the stack. The index structures for the various virtual spaces are also now no longer required. The allocation manager goes through the MLIST from the base to the tail, freeing the physical memory associated with each PC, PD, and PT page back to the pool.

The foregoing description of the single-core comparative example ignores the complexity imposed by a multicore architecture. It is particularly challenging, in the context of a multicore architecture, to manage the allocation and deallocation of memory in a way that frees memory promptly after the data stored in it has been consumed in the fragment shading phase. It would be desirable to provide an efficient memory management system that could accommodate the additional complexity of the multicore case.

Whereas in a single core system the geometry work is always processed in order, in a multicore system with parallelisation of geometry processing it is possible for the geometry work (PIMs) to be completed out of sequence. Now, when a partial render occurs, some of the PIMs may be renderable but others may not (because of a gap in the sequence of completed PIMs). This means that it is no longer safe to free memory based (solely) on the macrotile mask. It is also not safe to free all of the pages on the MLIST because, after a partial render, some of these pages will contain data that is required for fragment processing of PIMs that are (as yet) unrenderable.

Examples of multicore graphics rendering systems according to the present disclosure will now be described. These examples extend the single core comparative example, described above, for the multicore case. Except where specified to the contrary, it may be assumed that the features of the single core comparative example are retained in the multicore system. Thus, for example, the multicore system uses the same basic principles of the ALIST and MLIST memory management structures, but extends these to enable multicore functionality.

Multicore Graphics Rendering System

A fragment shading master unit, in one of the cores, is responsible for dividing up the fragment shading tasks and assigning and sending them to the various cores doing fragment processing work. In each core doing fragment processing work, a fragment processing slave unit receives the work sent by the fragment shading master unit. The fragment processing slave unit is responsible for managing the processing of the fragment shading work assigned to the respective core.

The fragment shading master unit divides the fragment processing work by tile. Different tiles are processed in parallel by different cores. However, there are typically more tiles than there are parallel pipelines in the graphics rendering system for the fragment processing. The fragment master unit distributes the tiles for fragment shading by following substantially the same patterns as used in the single-core comparative example—a conventional raster scan pattern or a modified raster scan pattern. A series of tiles scanned according to one of these patterns may be assigned to a given core. For instance, a set of four adjacent tiles may be assigned to one core, and the next set of four adjacent tiles may be assigned to another core. Assigning localised groups of tiles to the same core can help data locality—there is a reasonable likelihood that primitives that appear in one tile will appear also in a neighbouring tile; therefore, it may be possible to reuse cached primitive data in a given core doing fragment shading.

In the multicore case, in order to determine what memory can be freed after a partial render, the allocation manager needs to keep track not only of the macrotile(s) with which each page of memory in the parameter buffer is associated, but also the PIMs with which the memory is associated. This is done by adding a PIM value to each entry in the ALIST. The PIM value is set equal to the PIM number of the latest group (in the original sequence) whose primitives have been written to the virtual page—that is, the number of the last PIM written to the page.

The pages referenced in the ALIST are freed after a partial render only if they relate to PIMs that were rendered in full. This test is performed in addition to examining the macrotile mask. In other words, the pages referenced in ALIST entries are freed if and only if (i) they relate to macro tiles for which fragment processing has been completed and (ii) they relate only to PIMs that were renderable. As well as freeing the memory referenced in such ALIST entries, the ALIST entries themselves are marked as invalid (as they relate to memory that has now been freed).

The relevant ALIST entries can be identified because they have PIM values that are within the "renderable range". The renderable range is defined by a starting PIM (i.e. starting group index) and an ending PIM (i.e. ending group index). Groups (PIMs) are renderable if they are after (or equal to) the starting group index, and before (or equal to) the ending group index. The indices defining the renderable range are kept up-to-date at all times while geometry processing is ongoing.

This approach, of invalidating selected entries in the ALIST (and freeing the associated pages), can result in fragmentation within the ALIST, with invalid entries followed by or interspersed with entries that could not be invalidated because their PIMs have not yet been rendered. A solution to this is to compact (that is, consolidate) the entries that could not be freed, into a contiguous region of virtual memory at the start of the ALIST. This avoids a situation in which the length (tail) of the ALIST keeps increasing and it becomes more and more sparsely populated with valid data.

Any virtual pages that were previously used to store the ALIST, but which are no longer required as a result of the compaction step, are freed by the allocation manager.

In the same way that some ALIST entries need to be retained after a partial render, it is no longer possible to free all of the virtual pages referenced in the MLIST. The portions of the index that relate to physical memory that is still in use (storing currently unrenderable geometry data) must be retained. Without special adaptation, the entire index structure would have to be retained after a partial render. To address this, the information stored in each MLIST entry is expanded, to support more intelligent recycling of the pages used to store the index structures.

Each MLIST entry is augmented with:
A valid bit, which is set when a physical page is added and cleared when the page is removed from the MLIST.
An indication of the virtual space concerned—in particular, indicating whether the virtual page was used to store a tile control list, primitive block data, or ALIST data.
For virtual spaces that are segmented (as in the case of primitive blocks written by different cores, and the different tile control lists created by different cores) there is also an indication of the particular segment to which the MLIST entry relates.
An indication of the part of the virtual space that is indexed by the portion of memory referenced by this MLIST entry. This is stored with a granularity equal to the size of a page table (PT) page, as this is the finest granularity needed.
An indication of whether this MLIST entry relates to a PT, PD, or PC page.

This information is used to identify portions of the index structure that can be freed after a partial render (and corresponding MLIST entries that can be invalidated, accordingly). The "valid" bit enables compaction in the same way as for the ALIST. The valid entries can be compacted to a contiguous region of virtual memory at the start (base) of the MLIST.

According to the present exemplary implementation, the scanning of the MLIST is done after the scanning of the ALIST. When scanning the ALIST, ALIST entries that refer to freed memory pages are initially marked as invalid, prior to carrying out the compaction to consolidate the valid entries. Before the compacting step, the invalidated entries in the ALIST contain references to the virtual pages that have been freed. This information is used by the allocation manager to calculate ranges of virtual memory pages that are now free. Within each virtual address space, virtual pages are allocated in ascending order; and the PIMs are also fragment-processed in order; therefore, a partial render will lead to freeing of a consecutive range of virtual pages in each virtual space.

The additional information stored in the MLIST is compared with the newly-freed ranges of virtual pages derived from the ALIST scan, to identify MLIST entries that are no longer required. These MLIST entries have their "valid" bit cleared. The portions of the index (e.g. PD and/or PT pages) associated with these entries are then freed. Finally, the MLIST is compacted, consolidating the remaining valid entries at the start of the list in the same way as was done for the ALIST. This avoids the size (tail) of the MLIST growing perpetually, and minimises the storage space that it occupies. It is noted that—according to the present exemplary implementation—the memory used to store the MLIST is allocated statically rather than dynamically. Therefore, there is no need to free unused portions of the allocated memory. It is sufficient to merely compact the contents, so that the MLIST does not grow beyond the statically allocated area of memory as the hierarchical index is reused over successive partial renders.

A further aspect of the present disclosure concerns the way in which the virtualised spaces are segmented and how the different cores are enabled to access each space. Each core has its own MMU, but it would be desirable for all of the cores to share the same virtual memory space (albeit segmented appropriately). This is more efficient than maintaining a separate virtual space for each core (or component of a core, or other parallel pipeline).

In the geometry processing stage, each core writing output data is only concerned with its own segment of the respective segmented virtualised space. Virtual memory allocations by the allocation manager are only needed by components in the cores that requested the memory. However, in the fragment processing phase, all cores doing fragment processing need to access all of the segments of the segmented virtual spaces.

To address this dichotomy, a single PC page is pre-allocated by the allocation manager at the start-of-day (e.g. when the system is turned on), for each virtual space to be segmented. The PM primes the MMU in each core with these PC pages. This avoids the MMU of any core requesting its own PC page when that core first needs space to store geometry data.

The PC page is segmented such that each core (or component of a core) writing transformed geometry data uses a separate, non-overlapping set of entries in the PC page (and an associated non-overlapping range of virtual memory pages). Each core (or component) can use these entries as they write their own transformed geometry output to memory. But the index structure is a single index structure in memory. In the fragment processing phase, the cores consuming the data can access all of it seamlessly, since it is all in the same virtual space.

Examples will now be described in more detail with reference to FIGS. 1-7.

FIG. 1 is a block diagram illustrating a multicore graphics rendering system 100 according to an example. The system 100 comprises two cores in this example—a first core 101, and a second core 111. It should be understood that the system may include any number of cores, in general. The first core 101 comprises: an allocation manager 102; a geometry processing master unit 104; and a fragment shading master unit 106. It also comprises an MMU 108. The geometry processing master unit 104 is responsible for splitting up, assigning, and distributing geometry processing work packages (groups of primitives) among the various cores. The fragment shading master unit 106 is responsible for splitting up, assigning, and distributing fragment shading work packages (each relating to one or more tiles) among the various cores. The allocation manager 102 is configured to allocate memory for the activities performed by the cores—in particular, to allocate memory for the geometry processing.

The first core 101 further comprises a geometry processing slave unit 105 and a fragment shading slave unit 107. The geometry processing slave unit 105 is configured to control the processing of the share of the geometry processing work that is assigned to the first core 101. The fragment shading slave unit 107 is configured to control the processing of the share of the fragment shading work that is assigned to the first core 101.

According to the present example, the second core 111 is configured similarly to the first core. The cores 101 and 111 are designed and instantiated as identical components, because this is more convenient from the perspectives of design and validation, and also because it facilitates scalability. Each core is designed so that it may be instantiated in a given graphics rendering system by itself, or with any number of like cores. The second core 111 therefore comprises an allocation manager 112; a geometry processing master unit 114; a fragment shading master unit 116; and an MMU 118. However, only one instance of each master unit is needed in the graphics rendering system 100; therefore, only one instance of each master unit is active. In the present example, without loss of generality, it will be assumed that the master units (and allocation manager) of the first core 101 are active and those of the second core 111 are inactive. It should be understood, however, that this is not limiting on the scope of the present disclosure. Any given active master unit (or the active allocation manager) may reside in any of the cores in the multicore system.

The second core 111 also comprises a geometry processing slave unit 115 and a fragment shading slave unit 117. It should be understood that both of the geometry processing slave units 105 and 115 are active, and geometry processing work is divided between them by the geometry processing master unit 104. Likewise, both of the fragment shading slave units 107 and 117 are active, and fragment processing work is divided between them by the fragment shading master unit 106.

For the avoidance of confusion, it is worth noting the following about the naming of the components in FIG. 1. The appended claims refer to "first cores" as a label for cores that are configured to perform geometry processing work, and to "second cores" as a label for those cores that are configured to perform fragment processing work. The first core 101 and the second core 111 of FIG. 1 are not labelled in this way. In fact, both the first core 101 and the second core 111 are "first cores" within the meaning of that term in the claims, since both of these cores are configured to perform geometry processing work, in the present example. Likewise, both the first core 101 and the second core 111 are "second cores" within the meaning of that term in the claims, since they are both configured to perform fragment processing work, in the present example.

The system 100 further comprises a memory 120, which is shared between the cores 101, 111. The cores 101, 111 and the memory 120 are connected by a bus 130, or other suitable interconnect. The shared access to the memory 120 facilitates the parallel processing, by the cores, of geometry processing and fragment shading. The geometry processing slave units 105 and 115 write tile control lists and primitive blocks to the memory 120 as they execute the geometry processing. The fragment shading slave units 107 and 117 are then able to read these tile control lists and primitive blocks, as input for the fragment shading stage. As explained already above, each geometry processing slave unit produces a set of tile control lists-one tile control list per tile. Each fragment shading slave unit may be configured to process more than one tile at a time. A fragment shading slave unit, when processing a given tile, reads the N tile control lists for that tile (where N is the number of cores, or more specifically the number of cores with active geometry processing slave units). The fragment shading slave unit assembles these individual tile control lists into a single master control stream for the tile, and executes fragment shading based on this master control stream.

Figure 2A:
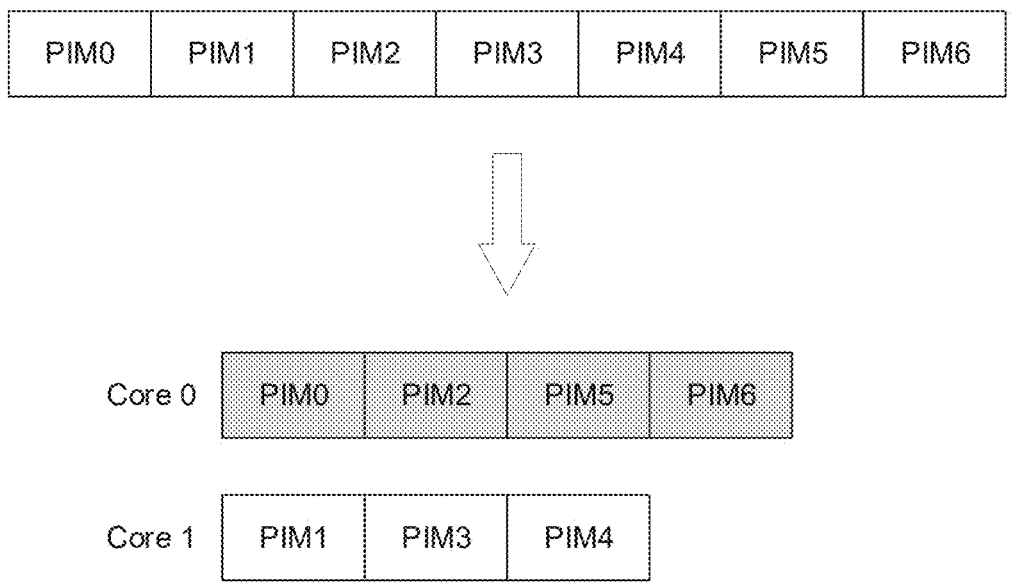
FIG. 2A illustrates a distribution of work packages between two cores.

FIG. 2A illustrates a distribution of geometry processing work packages between two cores. The contents of a draw call are illustrated as a sequence of blocks. Each of these blocks represents a work-package, and each is identified by its "pipeline interleave marker" (PIM). The PIM is the index of the work-package within the sequence of geometry-processing work-packages. Each work-package consists of a group of primitives requiring geometry processing. The PIM numbers are assigned to the blocks (work-packages) in consecutive increasing order, so that they capture the ordering of the primitives as received from the application driver in the draw call. The ordering of the primitives is also preserved within each block. The geometry processing master unit 104 is responsible for splitting up the draw call into these work-packages and assigning a PIM number to each package. The geometry processing master unit 104 is also responsible for assigning the various work packages to the cores that are available to do geometry processing work. One possible distribution of work packages is shown in FIG. 2A. The geometry processing master unit 104 assigns PIM0, PIM2, PIM5, and PIM 6 to the first core 101 (Core 0) and assigns PIM1, PIM3, and PIM4 to the second core 111 (Core 1). The geometry processing master unit 104 typically tries to split up the geometry processing work such that each core is utilised approximately equally. For example, if the cores are identical and have the same capacity to do work, then the geometry processing master unit 104 would seek to assign the same amount of work to each core. For example, the geometry processing master unit 104 may distribute the geometry processing work such that each core is assigned approximately the same number of primitives to process. However, it is impossible to predict accurately, in advance, how much computational work will be involved in processing a given set of primitives. Therefore, it is almost inevitable that imbalances in the workloads of the different cores will arise (despite the best efforts of the geometry processing master unit 104 to balance these workloads). It is therefore also almost inevitable that the processing of PIMs by the geometry processing slave units 105, 115 will finish out of sequence.

Figure 2B:
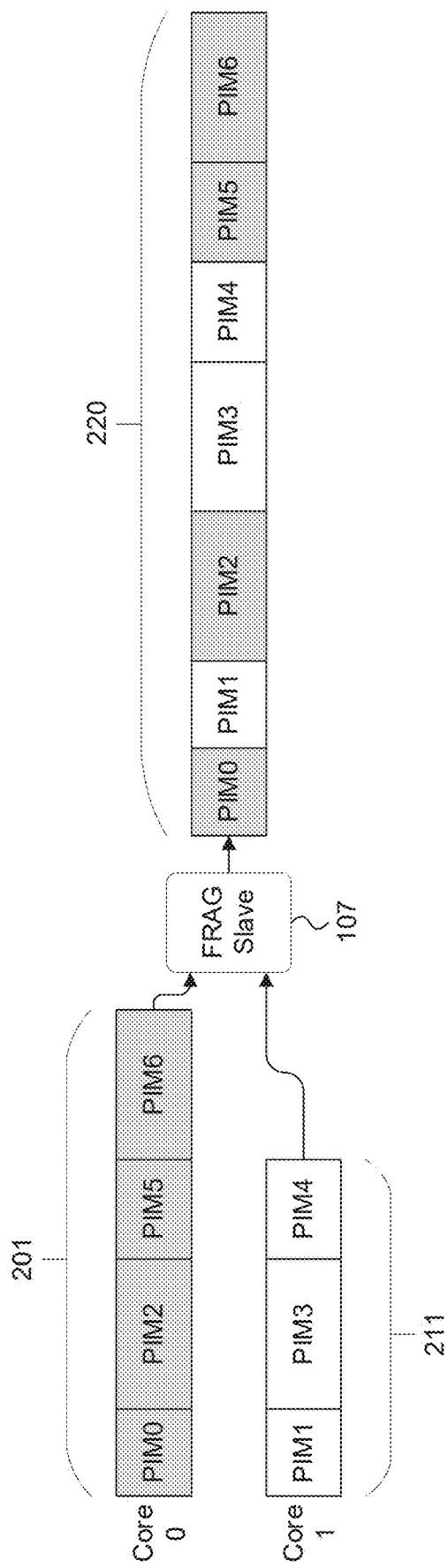
FIG. 2B illustrates the outputs of geometry-processing work-packages being recombined into a control stream for fragment processing.

The PIMs are used to re-impose the original sequence on the primitives. FIG. 2B illustrates the outputs of geometry-processing work-packages being recombined into a master control stream for fragment processing. Let us assume that the fragment shading slave unit 107 has been assigned the task of performing fragment shading for a single tile "Tile (0, 0)" of the frame. The first core 101 (Core 0) provides a first tile control list 201 for Tile (0, 0), containing the primitives of PIM0, PIM2, PIM5 and PIM6 that fall within the tile; the second core 111 (Core 1) provides a tile control list 211 containing the primitives of PIM1, PIM3 and PIM4 that fall within the tile. Note that the blocks representing the different PIMs are shown in FIG. 2B with varying widths, indicating the variable lengths of time that it takes to process them in the geometry processing stage.

The fragment shading slave unit 107 assembles the two tile control lists (one from Core 0 and one from Core 1) into a single master control stream 220. The stitching is done by reading PIM markers in each tile control list 201, 211 and stitching the PIMs back together in the correct order, according to their PIM numbers. Note that we have described the fragment shading slave unit 107 as processing a single tile purely for the purpose of simplicity. In general, as noted above, a fragment shading slave unit 107, 117 may be assigned more than one tile at a time to process. The splitting up and assignment of fragment shading work to the different fragment shading slave units 107, 117 is handled by the fragment shading master unit 106.

It will be understood from FIG. 2B that, if geometry processing has not been completed for a given PIM, none of the PIMs following it in the sequence can be processed in the fragment shading stage. The master control stream can only be stitched together to the extent that the geometry processing work has been completed. In order to perform geometry processing work, the geometry processing slave units 105, 115 require allocations of memory where they can write the outputs of their work (tile control lists and associated primitive blocks). In the same way that it is practically impossible to predict the computational complexity of performing geometry processing work for a given PIM, it is also practically impossible to predict the memory requirements for processing that PIM. For this reason, the memory allocation is handled dynamically. As explained already above, the cores 101, 111 share access to the memory 120. In order to share access in the manner required, they need a consistent view of what is stored where. According to the present implementation, this is achieved by providing centralised control of the memory allocations. Each time one of the geometry processing slave units 105, 115 needs additional memory, it requests it from the allocation manager 102. The allocation manager 102 allocates the memory from an available free stack reserved for geometry processing. When fragment shading is performed, the data written to the memory 120 by the geometry processing slave units 105, 115 is consumed by the fragment shading slave units 107, 117. Once tile control lists and primitive block data have been consumed during fragment shading, the corresponding memory can be deallocated and returned to the free stack by the allocation manager 102.

Figure 3A:
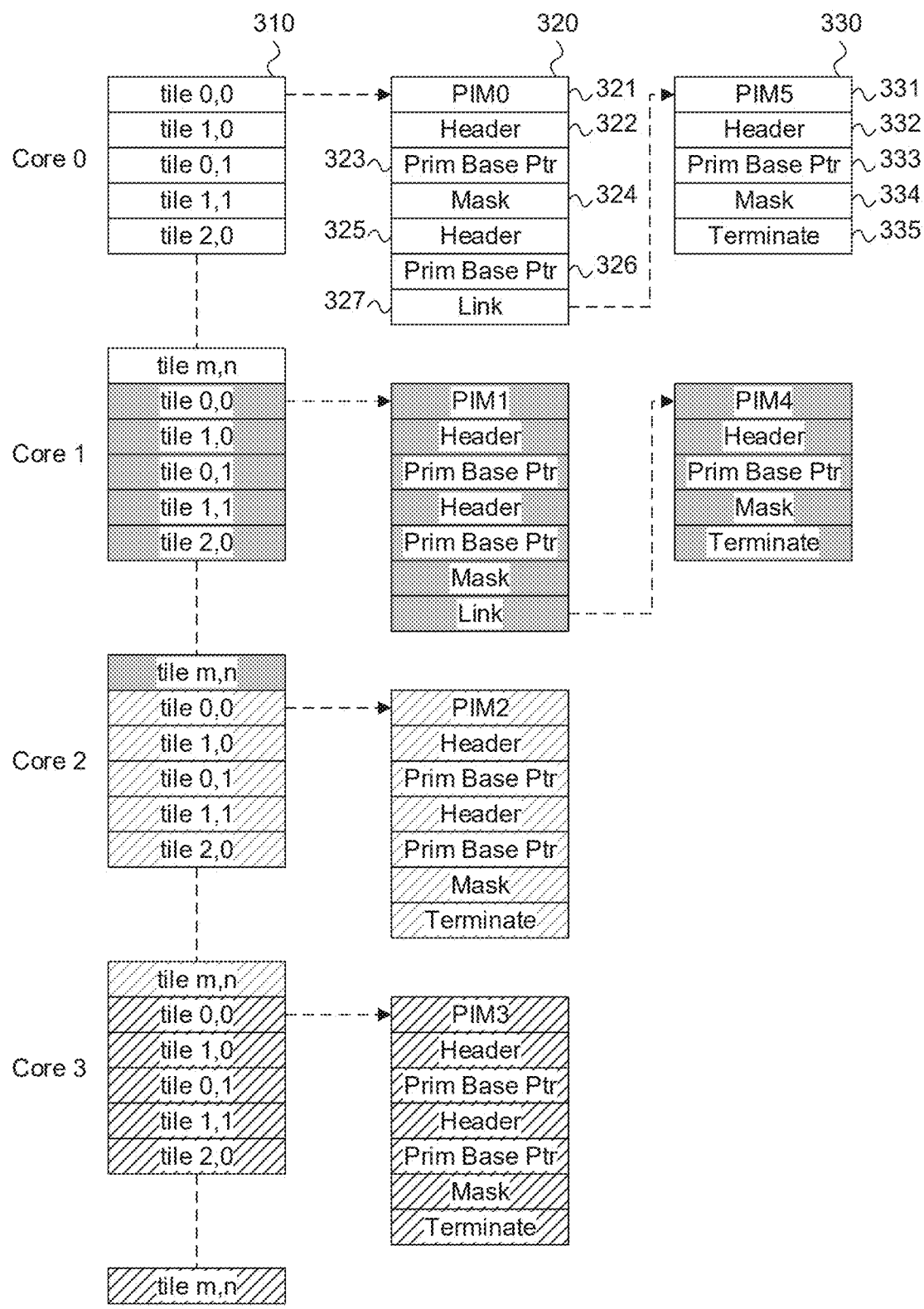
FIG. 3A shows exemplary tile control lists.

FIG. 3A shows tile control lists according to an example. In this example, there are four cores and m×n tiles in total. Each of the four cores produces m×n tile control lists—one for each tile. Therefore, for each tile, there are four tile control lists. The drawing illustrates the four tile control lists for Tile 0,0 (only). The tile control lists are stored in a linked list structure. A block of memory 310 stores head pointers (also referred to as "region headers") for each of the 4×m×n lists. Each head pointer points to the first block of memory in the list. The tile control list of Core 0 for Tile 0,0 starts with a second block of memory 320. The second block of memory starts with the group index (PIM number) 321 of the first group of primitives in the list. (In the example, this happens to be PIM0, however it could be any PIM number, in general.) This is followed by a header 322, containing information such as the number of primitives in the block, the format of the following mask, whether the primitive base pointer word is present (i.e., follows) or an offset is used (which is encoded in the header word) and some other small pieces of state data. In other words, the header generally describes setup information which allows the hardware to decode the control stream format correctly. Next is a pointer 323 to a primitive block containing the primitive data. The inclusion of such a pointer is optional. For example, as an alternative, the primitive data could be embedded directly in the tile control list. A mask 324 is provided (optionally), to indicate which primitives in the primitive block relate to the present tile control list (that is, relate to Tile 0,0). The mask 324 is followed, in this particular example, with a further header 325 and pointer 326. The data in the second block of memory 320 finishes with a link 327, which is a pointer to the next block of memory 330 in the linked list. This next block of memory 330 contains primitive data relating to a new group (PIM); therefore, it begins with the group index (PIM number) 331 of this group. In this example, the new group happens to be PIM5. The group index 331 is followed by a header 332; a pointer 333 to a primitive block; and an associated mask 334. The control list terminates with a terminate marker 335.

The other tile control lists for Tile 0,0, written by the other cores, are constructed similarly. Each list is written incrementally by a geometry processing slave unit of a core performing geometry processing. The blocks of memory (e.g. blocks 320, 330) used to store the tile control lists are allocated dynamically. To begin with, all of the head pointers in the block of memory 310 are initialised to null values. When a geometry processing slave unit wishes to write primitive data to a particular tile control list, it reads the respective head pointer. If the head pointer is a null pointer, the slave unit knows that no memory is currently allocated for this list. The slave unit requests a memory allocation from the allocation manager 102. The allocation manager 102 allocates the memory and returns the (virtualised) address of the block (for example, block 320). The geometry processing slave unit updates the head pointer of the respective tile control list with the address received from the allocation manager 102. The geometry processing slave unit then begins to fill the block of memory with the data of the tile control list. It requests a new block of memory from the allocation manager either (i) when it fills the current block, or (ii) when it begins processing primitives associated with a new group index (PIM number). It writes a link (for example, link 327) to the next block (for example, block 330) at the end of the preceding block (for example, block 320). A terminate marker (such as the marker 335) is written at the current endpoint of the tile control list. Staying with the example of FIG. 3A, if Core 0 has not yet finished its geometry processing work, it is in general not possible to predict whether the terminate marker 335 will remain the end of the tile control list, or if further data will need to be added. If the geometry processing slave unit of Core 0 encounters further primitives of PIM5 that belong in Tile 0,0, it will write the relevant data to the block of memory 330—beginning by overwriting the terminate marker 335. If the block of memory 330 is full or if the geometry processing slave unit of Core 0 finds a primitive of a subsequent group (for example, PIM7) that belongs in Tile 0,0, then it will request a fresh block of memory from the allocation manager 102.

Figure 3B:
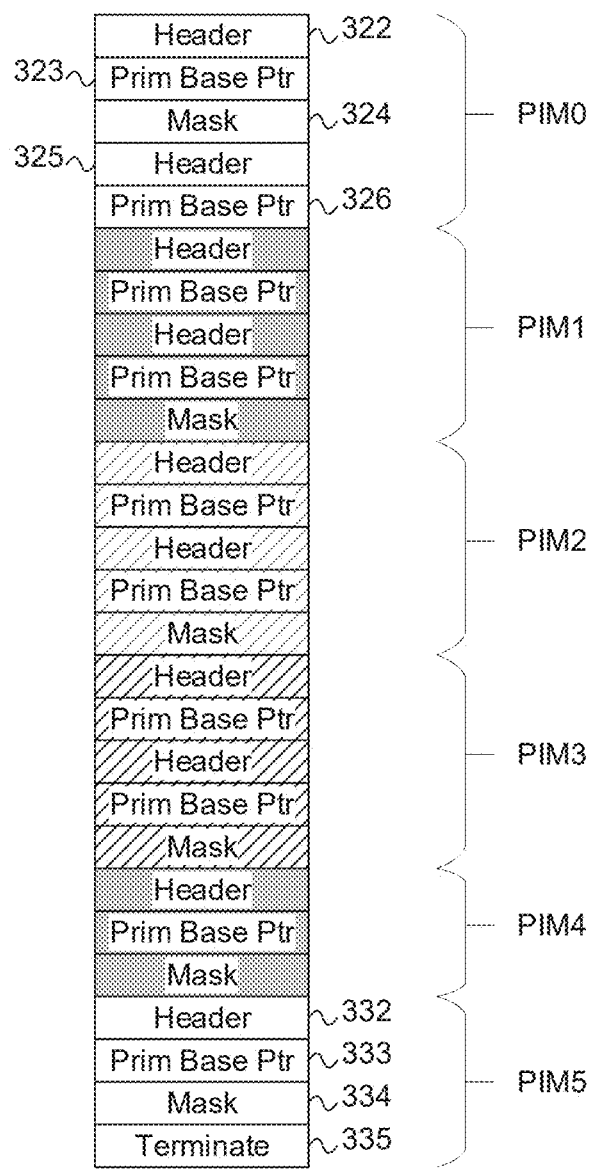
FIG. 3B shows an exemplary control stream, produced by stitching together the tile control lists of FIG. 3A.

FIG. 3B shows the stitched master control stream generated for Tile 0,0 from the tile control lists in the example of FIG. 3A. The group indices (PIM numbers) have been removed, because they are no longer needed in the combined control stream—the ordering of primitives is once again implicit from the order in which they are encountered in the control stream. Similarly, the links have been removed, because the control stream is a single consecutive stream of data—it is no longer fragmented in separate blocks of memory. The remaining information in the tile control lists is stitched into the combined control stream. This includes the headers, the pointers to primitive blocks, and the masks.

According to the present implementation, the combined control stream is never stored to the memory 120. It is assembled by the core doing the relevant fragment processing, and is consumed directly, by that core. This saves time and increases efficiency, since there is no need to write the combined control stream and read it again from memory. It also reduces memory access bandwidth. Incidentally, although the example of FIGS. 3A-3B involves a consecutive, unbroken series of PIM numbers (from 0 to 5), this is generally not the case. In general, a control stream will involve a monotonic series of group indices, but there will usually be gaps (since, for some groups, none of the primitives will end up in the tile in question). In the present example, using ascending PIM numbers, the series is a monotonically increasing series. It should be understood that the series could equally be represented instead by descending PIM numbers. This would result in a monotonically decreasing series.

As mentioned previously above, a partial render may be performed, in order to recover space in the memory 120 occupied by primitive data (tile control lists and primitive blocks). The need to support partial renders adds complexity to both the geometry processing stage and the fragment shading stage, as will be explained below. However, it allows memory to be managed more efficiently, and can potentially enable more complex scenes to be rendered successfully, for a given available memory size. In other words, without the possibility to perform a partial render, the graphics rendering system 100 might be more susceptible to running out of memory when performing geometry processing in parallel as described above. A system that supports partial renders can enable scenes to be rendered which involve large volumes of primitive data, using a TBDR approach, with reduced risk of running out of memory.

The first measure taken to support partial renders is to provide the geometry processing slave units 105 and 115, and the fragment shading slave units 107 and 117, with information about the "renderable range" of groups. This is the series of groups that are currently available to be rendered in a partial render. In the present example, the renderable range is defined by a starting group index, indicating the starting group of the range, and an ending group index, indicating the ending group of the range. Groups (PIMs) are renderable if geometry processing has been completed for them. The starting group is the earliest group in the ordering (corresponding to the lowest PIM number in the present example) for which geometry processing has completed, but which has not yet been submitted for fragment shading. The ending group is the earliest group in the sequence for which geometry processing has not yet completed. The ending group is also called the "lowest active PIM", since it is the PIM with the lowest PIM number of those currently undergoing geometry processing by the geometry processing slave units (when using ascending PIM numbers, and subject to wrapping of the PIM number).

Figure 4:
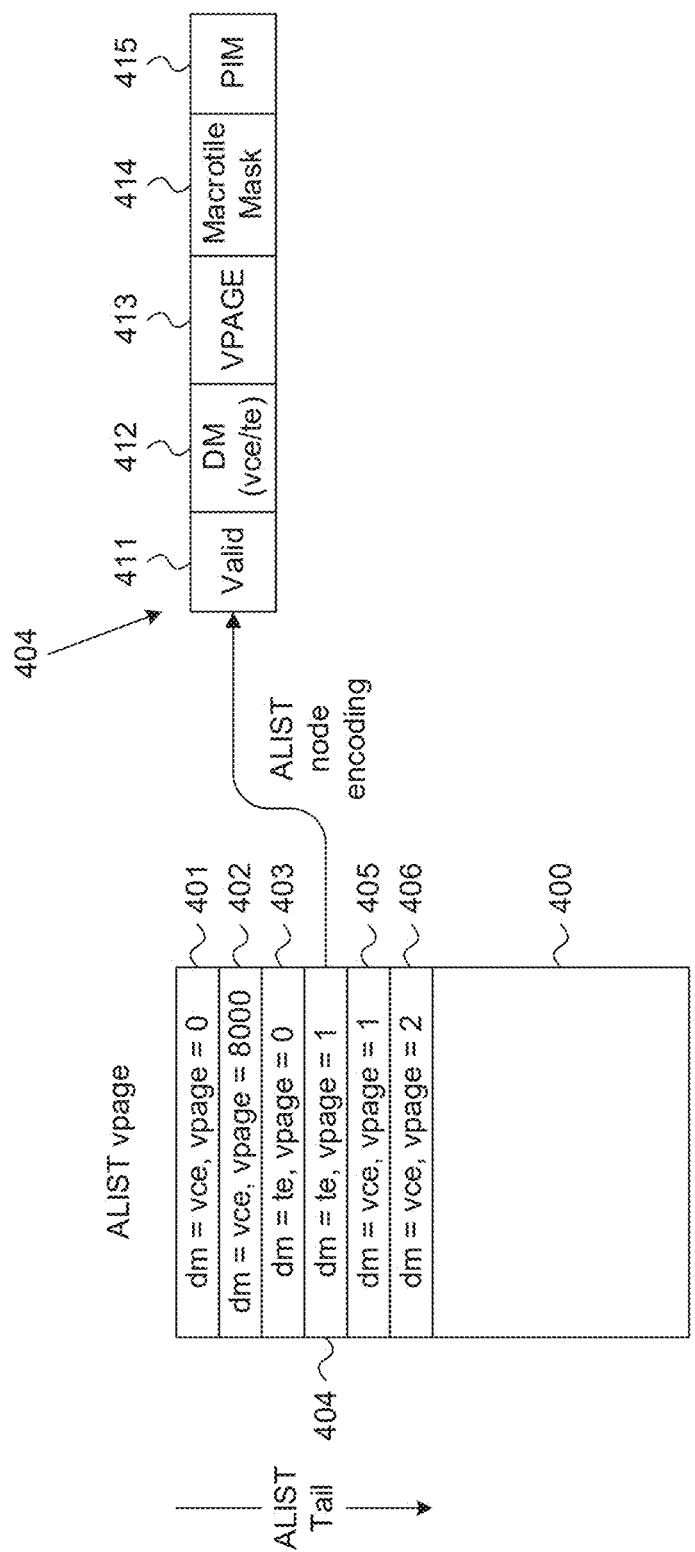
FIG. 4 illustrates the contents of an allocation list (ALIST), according to an example.

FIG. 4 shows an example of the contents of an allocation list (ALIST) 400. As explained above, the ALIST 400 contains a list of "closed" virtual memory pages. "Closed" means that the cores performing geometry processing have finished writing to these pages. The allocation manager 102 adds entries to the ALIST each time a geometry processing slave notifies it that a page has been closed. As shown in FIG. 4, each ALIST entry (or "node") 401-406 contains the following information:

A "valid" flag (typically a "valid" bit) 411.
An indication "DM" 412 of the virtualised memory space concerned. According to the present implementation, one virtualised memory space (labelled "tcl") is provided for tile control lists, and another virtualised memory space (labelled "vce") is provided for primitive blocks.
The address "VPAGE" 413 of the virtual memory page concerned.
A macrotile mask 414, indicating the spatial location (in the frame) to which the geometry data stored in the virtual memory page pertains.
The PIM number (group index) 415 of the latest group of primitives whose geometry data is stored in the virtual memory page.

The ALIST contents are used during fragment processing, to determine when the virtual memory pages can be freed. It will be noted that, within a given virtualised memory space, the virtual memory pages are allocated in consecutive increasing order. In other words, in each virtualised memory space, vpage=0 is followed by vpage=1, vpage=2, and so forth. It will also be noted that the ALIST entries associated with different virtualised memory spaces are interspersed in the list. This is a function of the order in which the pages are closed.

Figure 5:
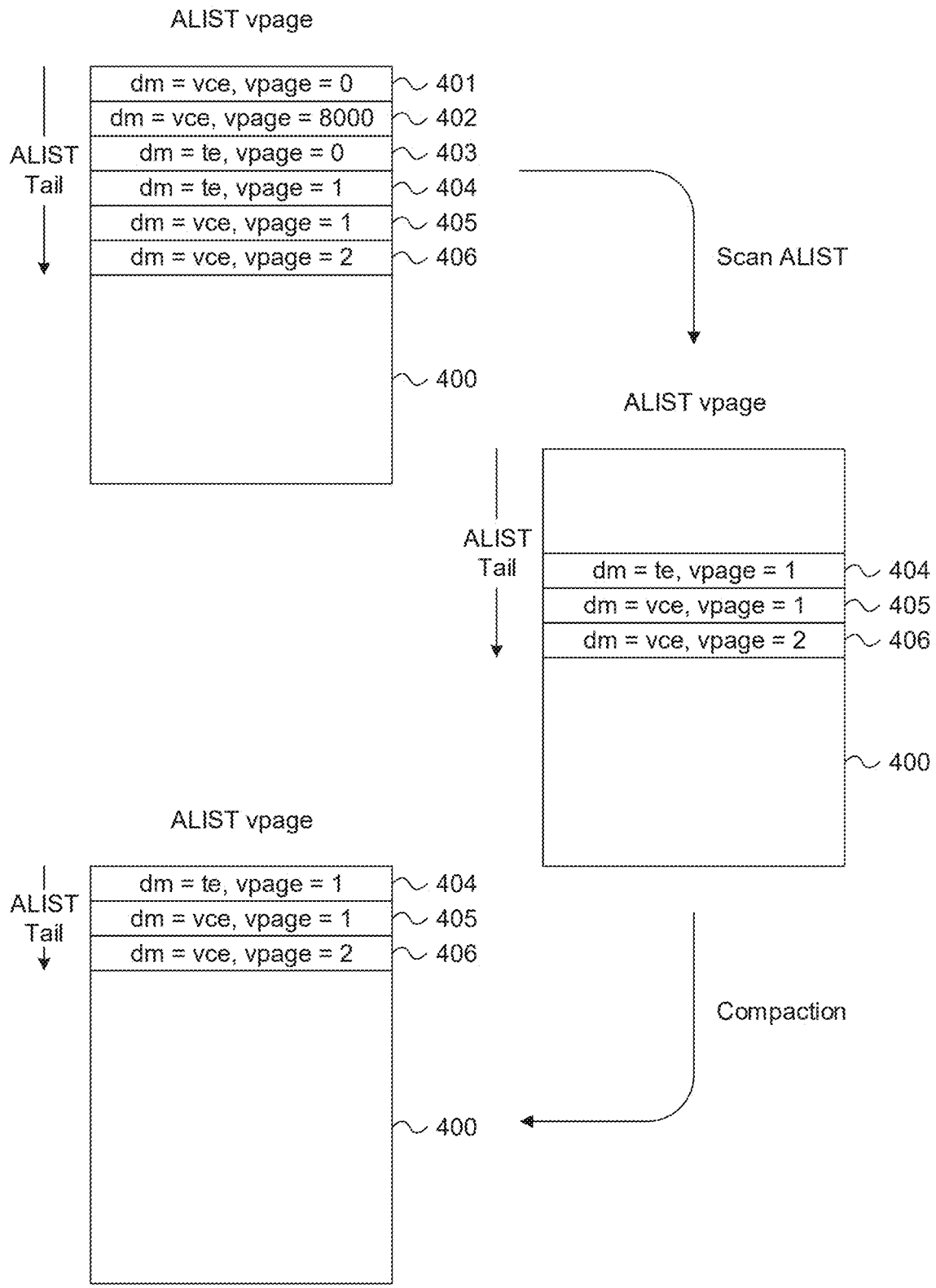
FIG. 5 illustrates scanning and compaction of the ALIST, according to an example.

FIG. 5 shows an example of updating the ALIST after a partial render. If the last PIM that was written to a given virtual memory page is included in the renderable range, then that page can be freed and the corresponding entry in the ALIST is no longer required. The allocation manager 102 scans the ALIST 400 and frees the virtual memory pages referenced in the relevant entries 401-403. It also invalidates the relevant entries 401-403 by setting the valid flag to zero. The resulting structure is wasteful of ALIST space, because it is fragmented. The allocation manager 102 scans the ALIST again, and consolidates the remaining valid entries 404-406 to the start of the list (by copying/moving them there). If this reduces the number of virtual memory pages required to store the ALIST, any virtual memory pages above the ALIST tail range are freed and recycled.

Figure 6A:
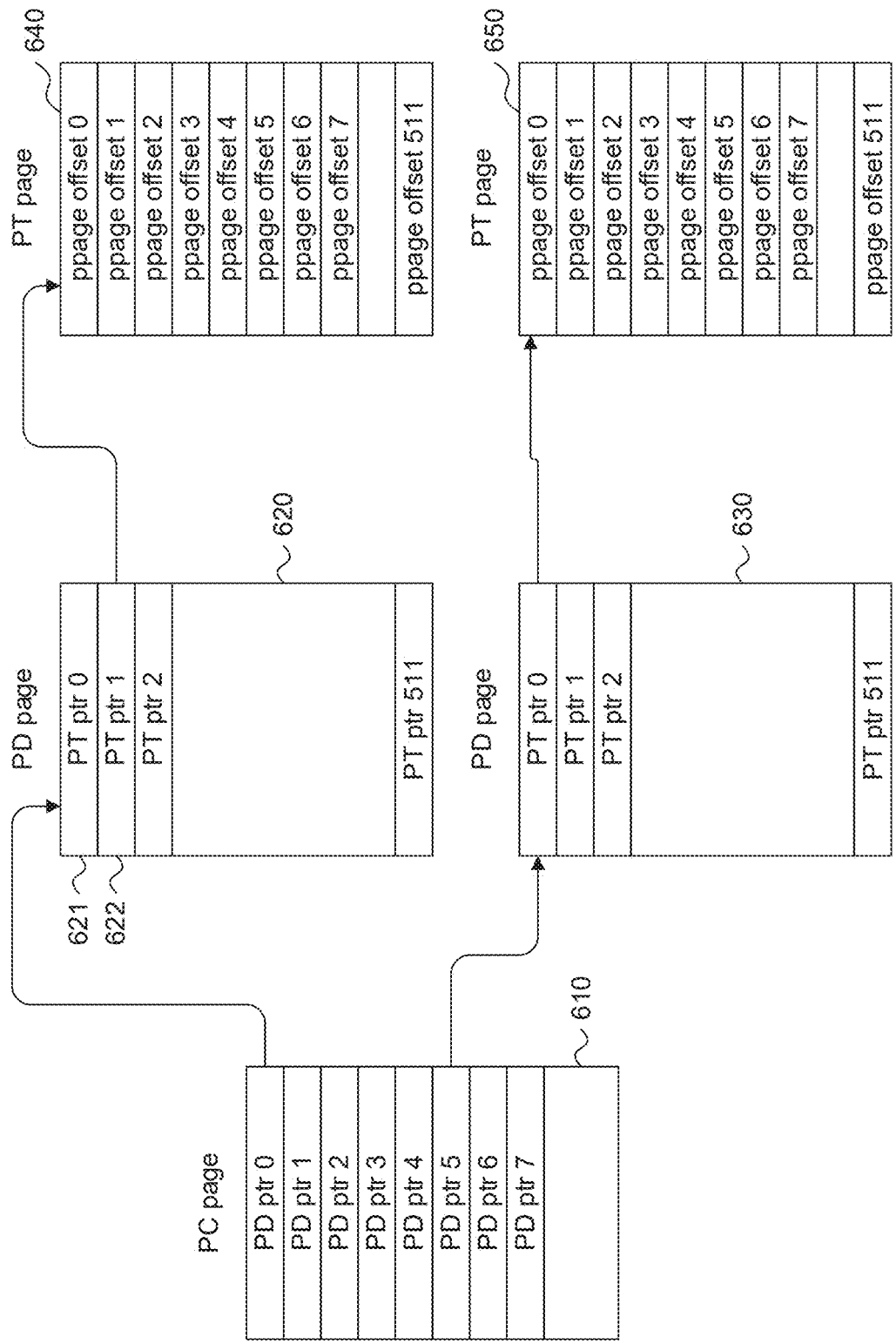
FIG. 6A illustrates a hierarchical index structure for a virtualised memory space, according to an example.

FIG. 6A shows an example of a hierarchical index structure, for storing the mapping from virtual memory pages to physical memory pages, for a given virtualised memory space. The present example, the hierarchical index structure has three levels. A page catalogue (PC) page 610 forms the top level, one or more page directory (PD) pages 620, 630 form the second level; and one or more page table (PT) pages 640, 650 form the third and final level. The PC page contains 1024 entries, each pointing to a PD indexing 1 GB. Each PD page contains 512 entries, each pointing to a PT indexing 2 MB. Each PT page contains 512 entries, each detailing a physical memory page allocation.

A virtualised memory space may be segmented. This is done in particular for the space used to store tile control lists and the space used to store primitive blocks. In the present implementation, this space is limited to 128 GB of virtual memory for the primitive blocks and 64 GB for the tile control lists; therefore, there are 128 active entries in the PC page for the primitive blocks, and 64 active entries in the PC page for the tile control lists. The spaces are segmented by dividing them equally between the different pipelines/cores doing geometry processing. For instance, if we assume that eight parallel pipelines (for example, eight cores) are performing geometry processing and therefore producing primitive blocks, then there are eight segments in the virtualised memory space, and each segment of the space for primitive blocks has 16 PC entries (corresponding to 16 GB of virtual memory per segment). The virtualised space for the tile control lists is segmented similarly. The PC entries are always allocated such that no two segments share the same PC entry. This means that a given core doing geometry processing only needs to access its own part of the PC (and the associated parts of the lower levels of the hierarchical index). Meanwhile, in the fragment shading stage, any core doing fragment processing will have access to the entire virtualised memory space. Therefore, any core doing fragment processing can access the tile control lists produced by any core that did geometry processing.

The PD pages and PT pages are allocated dynamically by the allocation manager, to the MMUs of the various cores doing geometry processing, as and when virtual memory pages are allocated that cannot be indexed in the portion of the hierarchy that has already been allocated. The PC page is allocated statically. In the present implementation, the allocation manager sets up the PC page at the start-of-day (e.g. when the device is powered up, or at start of the rendering task). It primes the MMU 108, 118 of each core 101, 111 with the address of this page, so that each core "sees" the same shared virtual memory mapping.

It should be understood that the three-level hierarchy illustrated in FIG. 6A is merely exemplary. For instance, the number of levels and the size of the pages (in terms of bit-width and length) at each level may be adapted according to the needs of other implementations.

Figure 6B:
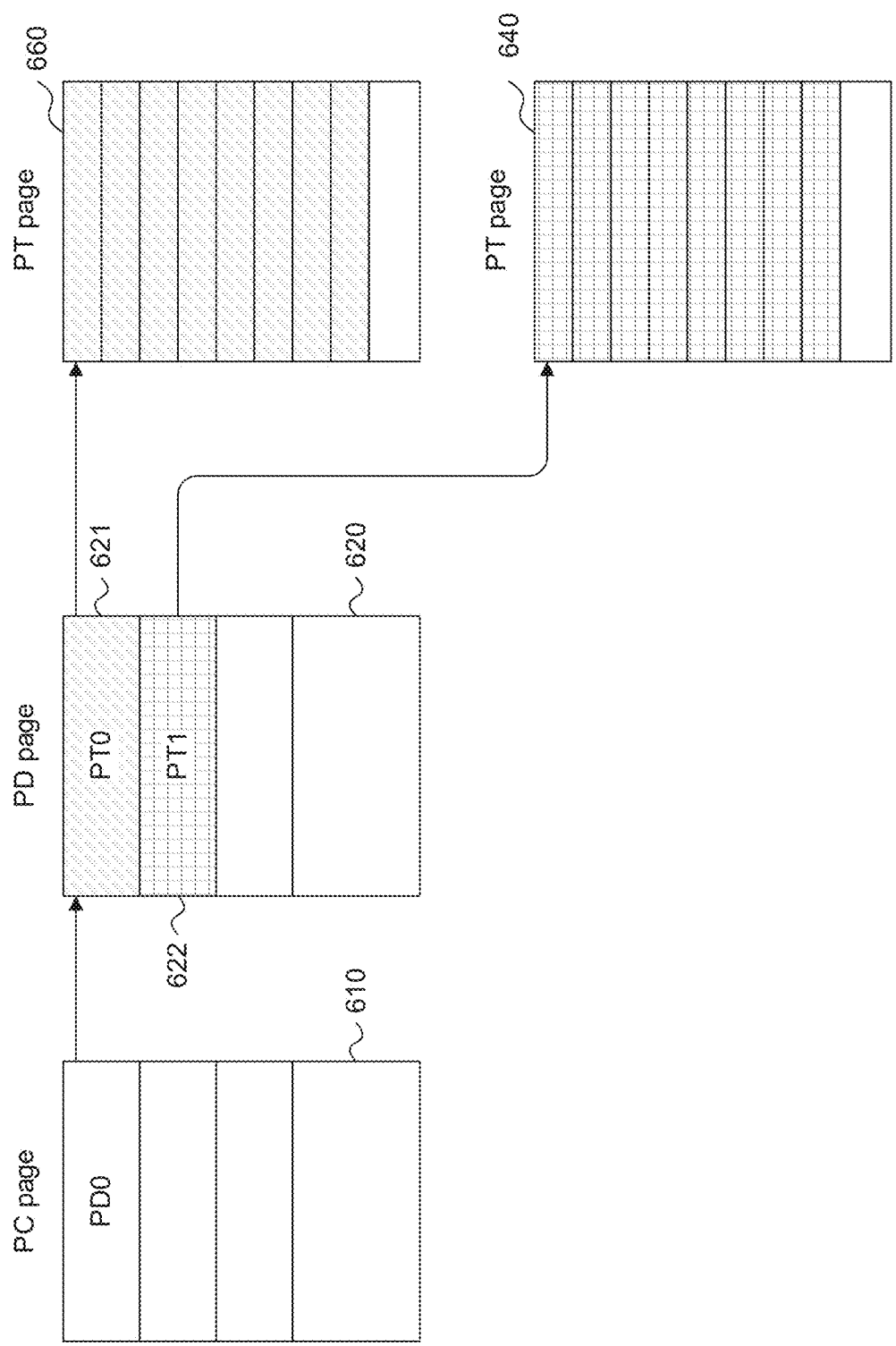
FIG. 6B illustrates the contents of the hierarchical index structure after a partial render, according to an example.

FIG. 6B shows a simplified example of how the hierarchical index may appear following a partial render. The pages of the index contain references 621, 660 to some virtual pages that have been freed as a result of the partial render (indicated with diagonal hatching in the drawing). It contains other references 622, 640 to virtual pages that have not been freed and are still required for fragment processing work that is yet to be done. These latter references are indicated with a vertical-horizontal grid pattern in the drawing. The parts of the index that are no longer in use, as a result of the freeing of memory in the partial render, can themselves be released back to the free stack. This is managed using the MLIST.

Figure 7:
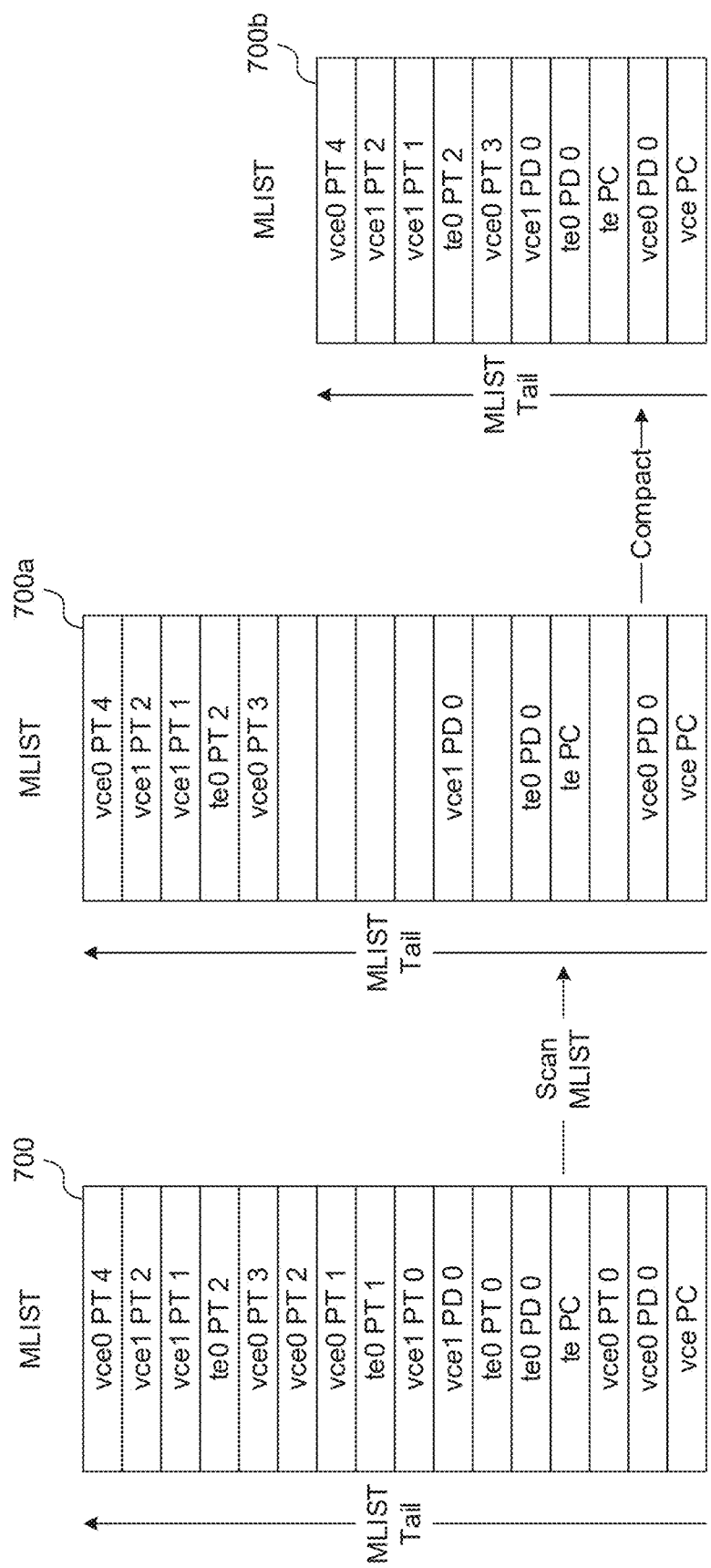
FIG. 7 illustrates a way of updating an MMU list (MLIST) following a partial render, according to an example.

FIG. 7 shows an example of an MLIST 700, indicating how it is updated following a partial render. Each entry in the MLIST indicates the virtualised memory space to which it relates (te/vce). For segmented spaces, the entry also indicates the segment of the space to which it relates (vce0/vce1). It also indicates the level of the hierarchical index to which it relates (that is, whether it relates to the PC page, a PD page or a PT page), and which page of that level it concerns (PT0, PT1, PT2, . . . /PD0). There is also a valid bit, not shown explicitly in the drawing.

In a partial render, only a part of the entire virtual space can be rendered. This means that some parts of the hierarchical index structure are still needed, while other parts are no longer needed and can be freed. As shown in FIG. 7, the allocation manager 102 scans the MLIST to determine which parts of the index structure can be freed. This is done after the scanning of the ALIST (and the freeing of the virtual memory pages themselves). The ALIST scan reveals ranges of virtual pages that have now been freed. The allocation manager, when scanning the MLIST, marks any MLIST entries pertaining to these ranges as invalid. The resulting revised version of the MLIST 700a contains the same entries as before, except that some of them are marked invalid. These are shown as blank entries in FIG. 7.

In the example of FIG. 7, PT0, PT1, and PT2 in vce0 are marked as invalid. However, PT3, and PT4 in vce0 are retained. Consequently, PD0 in vce0 (which stores the pointers to PT3 and PT4) must also be retained. Similarly, PT0, and PT1 in te0 are invalidated, but PT2 is retained, along with PD0. In vce1, PT0 is invalidated, while PT1, PT2 and PD0 are retained.

The virtual pages referenced in the invalid entries are freed. Then, the allocation manager 102 consolidates the remaining valid MLIST entries, to eliminate the fragmentation, in the same way as was done for the ALIST. The result is an MLIST 700b that contains a single continuous block of valid entries.

It should be understood that the examples described above, with reference to FIGS. 1 to 7, are exemplary—the scope of the present disclosure is not limited to these examples.

For instance, in the examples above, all of the cores 101, 111 were identical. This is not essential—different cores could be instantiated with different combinations of components. For example, some cores may be configured for, and contain hardware only for, geometry processing, while other cores may be configured for, and contain hardware only for, fragment shading.

Even if the cores are identical, it is not necessary that both geometry processing work and fragment shading work are assigned to all cores. A fragment shading master unit may choose to distribute fragment shading work to a subset of the cores, even if other cores also possess fragment shading slave units. The same is true of the geometry processing master unit and geometry processing slave units. At any given time, a given core may therefore be involved in geometry processing, or fragment shading, or both.

Cores may include local memory, forming a local cache, optionally with multiple levels. When data is read from the memory 120 by the core, it may be retained in the local cache for possible future reuse. The data may be reused by another component (for example, another slave unit, or another rasterization pipeline or processor)—that is, a component other than the component that was responsible for originally reading the data from the memory 120.

Pointers are commonly invalidated by setting them equal to zero, or "null". Of course, this is not essential. Any special value could in principle be reserved to indicate an invalid pointer, which does not point to any valid block of memory. For example, a convention could be adopted whereby a binary address consisting of all ones could denote an invalid pointer.

In the examples above, reference was made to the "lowest" active PIM—this being the active PIM having the earliest position in the original geometry sequence. In this regard, it should be understood that the term "lowest" is not limiting. Labelling the earliest active PIM as the "lowest" one depends on numbering with successively increasing PIM numbers (subject to wrapping). In an alternative implementation, the PIM numbers could be assigned such that they follow a decreasing sequence. In this alternative implementation, the earliest active PIM would be the "highest" active PIM. The preceding (completed) PIMs would have higher PIM numbers; the subsequent PIMs would have lower PIM numbers (again, subject to wrapping).

Figure 8:
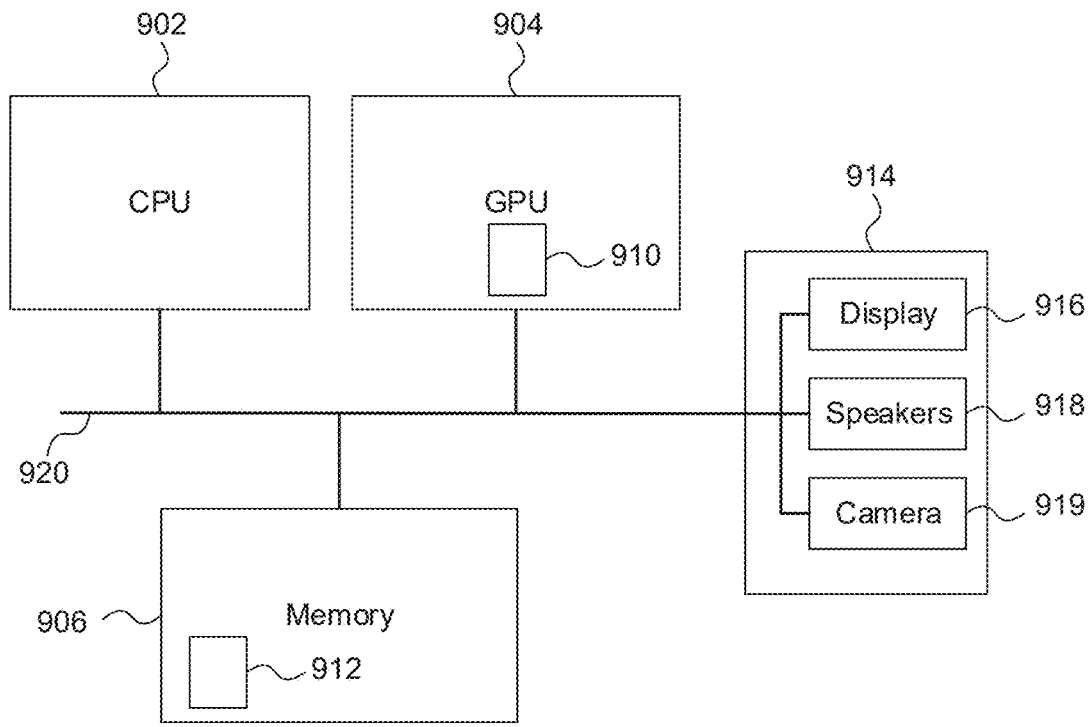
FIG. 8 shows a computer system in which a graphics processing system is implemented.

A core 101, 111, or a 3-D graphics rendering system 100, as described above, may be implemented as part of a graphics processing system. FIG. 8 shows a computer system in which such a graphics processing system may be implemented. The computer system comprises a CPU 902, a GPU 904, a memory 906 and other devices 914, such as a display 916, speakers 918 and a camera 919. A processing block 910 (corresponding to the cores 101 and 111, and bus/interconnect 130) is implemented on the GPU 904. In other examples, the processing block 910 may be implemented on the CPU 902. The components of the computer system can communicate with each other via a communications bus 920. A store 912 (corresponding to memory 120) is implemented as part of the memory 906.

While FIG. 8 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA), or by adding the NNA as an additional unit. In such cases, the processing block 910 can be implemented in the NNA.

The cores 101, 111 and graphics rendering system 100 of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a core or graphics rendering system need not be physically generated by the core or graphics rendering system at any point and may merely represent logical values which conveniently describe the processing performed by the core or graphics rendering system between its input and output.

The cores and graphics rendering systems described herein may be embodied in hardware on an integrated circuit. The cores and graphics rendering systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a core, graphics rendering system, or graphics processing system configured to perform any of the methods described herein, or to manufacture a core, graphics rendering system, or graphics processing system comprising any apparatus described herein. An integrated circuit definition dataset may be, for example, an integrated circuit description.

Therefore, there may be provided a method of manufacturing, at an integrated circuit manufacturing system, a core, graphics rendering system, or graphics processing system as described herein. Furthermore, there may be provided an integrated circuit definition dataset that, when processed in an integrated circuit manufacturing system, causes the method of manufacturing a core, graphics rendering system, or graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a core, graphics rendering system, or graphics processing system will now be described with respect to FIG. 9.

Figure 9:
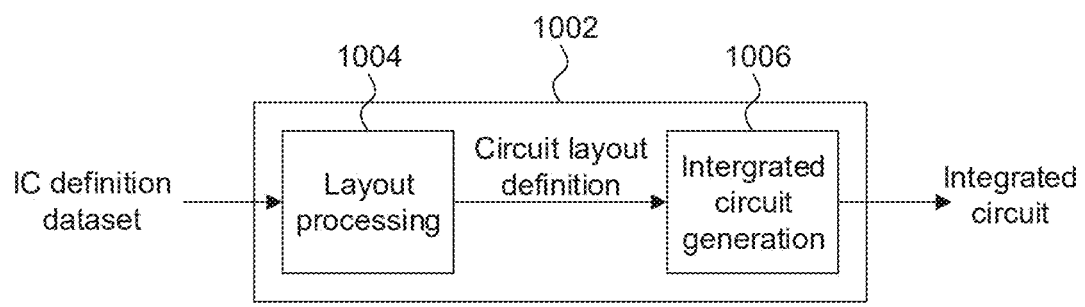
FIG. 9 shows an integrated circuit manufacturing system for generating an integrated circuit embodying a graphics processing system.

FIG. 9 shows an example of an integrated circuit (IC) manufacturing system 1002 which is configured to manufacture a core, graphics rendering system, or graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a core, graphics rendering system, or graphics processing system as described in any of the examples herein), process the IC definition dataset, and generate an IC according to the IC definition dataset (e.g. which embodies a core, graphics rendering system, or graphics processing system as described in any of the examples herein). The processing of the IC definition dataset configures the IC manufacturing system 1002 to manufacture an integrated circuit embodying a core, graphics rendering system, or graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a core, graphics rendering system, or graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A multicore graphics rendering system comprising a plurality of cores configured to implement tile-based rendering of a stream of primitives,
   wherein first cores of the plurality of cores are configured to perform geometry processing work, and second cores of the plurality of cores are configured to perform fragment processing work;
   wherein each first core is configured to process groups of primitives, to produce transformed geometry data describing, for each of a plurality of tiles, the primitives processed by that first core that are present in that tile, each group being associated with a group index, the group indices defining an ordering of the groups in the stream of primitives;

the first cores being configured to store in a memory the transformed geometry data that they produce;

each second core being configured to perform fragment processing for one or more of the tiles, wherein each second core is configured to, for each tile to be processed, read from the memory the transformed geometry data produced by the first cores for that tile;

wherein one of the cores of the plurality of cores comprises an allocation manager, configured to allocate portions of the memory to the first cores to store the transformed geometry data;

wherein the allocation manager maintains an allocation list (ALIST), storing, for each portion of the memory written to by the first cores, an indication of a part of the frame with which that portion is associated, and the latest group index of the transformed geometry data written to the portion;

wherein a renderable range of groups comprises the primitives, the renderable range starting with a starting group and ending with an ending group;

wherein the second cores are configured to execute a partial render, comprising performing fragment processing for the primitives in the renderable range of groups, wherein, before executing the partial render, the geometry processing has been completed for every group ahead of the ending group in the ordering;

wherein the allocation manager is configured to scan the ALIST to identify portions of the memory that have been fully consumed by the second cores performing fragment processing;

wherein the scan comprises, for each portion of the memory:

comparing the indication of the part of the frame, in the ALIST, with an indication of parts of the frame for which fragment processing has been completed; and comparing the latest group index, in the ALIST, with the group index of the ending group, defining the end of the renderable range; and wherein the allocation manager is configured to free the portions of the memory identified in the scan.

2. The graphics rendering system of claim 1, wherein the transformed geometry data produced by each first core comprises:

a set of tile control lists, describing for each tile, the primitives processed by that first core that are present in that tile;

a head pointer for each tile control list, wherein the head pointer points to the start of the respective tile control list; and one or more primitive blocks, containing data describing the primitives, wherein the tile control lists contain pointers to the one or more primitive blocks.

3. The graphics rendering system of claim 1, wherein the allocation manager is configured to scan the ALIST:

(i) after completion of the partial render; and/or (ii) after completion of at least some tiles of the partial render, optionally after completion of a predetermined number of rows of tiles.

4. The graphics rendering system of claim 1, wherein the allocation manager is further configured to allocate portions of the memory for storing the ALIST;

wherein, following the scan, the allocation manager is configured to compact the ALIST, such that ALIST entries identified in the scan are invalidated and entries other than those identified in the scan are consolidated into a consecutive set of entries.

5. The graphics rendering system of claim 4, wherein the allocation manager is further configured to, after compacting the ALIST, free any portions of the memory used to store the ALIST that are no longer required following the consolidation.

6. The graphics rendering system of claim 1, wherein the graphics rendering system uses at least one virtualised memory space, wherein each core comprises a memory management unit (MMU), configured to translate between virtual memory portions in the at least one virtualised memory space and physical memory portions of the memory, wherein the allocation manager is configured to allocate for the MMUs a hierarchical index, to index the physical memory portions associated with the virtual memory portions in the at least one virtualised memory space;

wherein the allocation manager is configured to record the portions of the memory allocated to the MMUs for the hierarchical index in an MMU list (MLIST);

wherein the MLIST comprises a plurality of entries, each entry being associated with a respective portion of the hierarchical index, wherein each entry includes an indication of the portion of virtual memory that is indexed by that portion of the hierarchical index;

wherein the allocation manager is configured to, after scanning the ALIST:

identify, from the MLIST, the portions of the memory associated with indexing virtual memory that has been fully consumed by the plurality of second cores performing fragment processing; and free the identified portions of the memory.

7. The graphics rendering system of claim 6, wherein the allocation manager is configured to, after freeing the identified portions of the memory, compact the MLIST, such that MLIST entries corresponding to the freed portions of the memory are invalidated, and the remaining MLIST entries are consolidated into a consecutive set of entries.

8. The graphics rendering system of claim 6, wherein the hierarchical index includes a top level and one or more additional levels, wherein the memory for storing the top level of the hierarchical index is allocated statically, and wherein the memory for storing the one or more additional levels of the hierarchical index is allocated dynamically.

9. The graphics rendering system of claim 6, wherein a segmented virtualised memory space is a virtualised memory space containing a plurality of segments, and wherein each MLIST entry contains any one or any combination of two or more of:

an indication of the virtualised memory space to which the memory portion referenced in the MLIST entry pertains;

for the segmented virtualised memory spaces, an indication of the segment to which the memory portion referenced in the MLIST entry pertains;

an indication of the level of the hierarchical index structure to which the memory portion referenced in the MLIST entry pertains.

10. The graphics rendering system of claim 6, wherein the allocation manager is configured to segment the virtualised memory space such that the first cores are allocated respective non-overlapping virtual address ranges in the space, the virtual address ranges being associated with different entries in a top level of the hierarchical index, wherein the allocation manager is configured to, before geometry processing for a frame begins, pre-allocate the top level of the hierarchical index, and prime each MMU by providing it with said top level of the hierarchical index.

11. A method for tile-based rendering of a stream of primitives in a multicore graphics rendering system comprising a plurality of cores, the method comprising:
using first cores of the plurality of cores, performing geometry processing work; and
using second cores of the plurality of cores, performing fragment processing work,
wherein the geometry processing work comprises processing, by each first core, groups of primitives, to produce transformed geometry data describing, for each of a plurality of tiles, the primitives processed by that first core that are present in that tile, each group being associated with a group index, the group indices defining an ordering of the groups in the stream of primitives,
the method further comprising storing, by the first cores, in a memory, the transformed geometry data that they produce,
wherein the fragment processing work comprises, for each second core, performing fragment processing for one or more of the tiles, comprising, for each tile to be processed, reading from the memory the transformed geometry data produced by the first cores for that tile, the method comprising:
allocating portions of the memory to the first cores to store the transformed geometry data,
maintaining an allocation list (ALIST), storing, for each portion of the memory written to by the first cores, an indication of a part of the frame with which that portion is associated, and the latest group index of the transformed geometry data written to the portion,
executing, by the second cores, a partial render, wherein a renderable range of groups comprises the primitives and the renderable range starts with a starting group and ends with an ending group and the partial render comprises performing fragment processing for the primitives in the renderable range of groups, wherein, before executing the partial render, the geometry processing has been completed for every group ahead of the ending group in the ordering,
scanning the ALIST to identify portions of the memory that have been fully consumed by the second cores performing fragment processing,
wherein the scanning comprises, for each portion of the memory:
comparing the indication of the part of the frame, in the ALIST, with an indication of parts of the frame for which fragment processing has been completed; and
comparing the latest group index, in the ALIST, with the group index of the ending group, defining the end of the renderable range, and
freeing the portions of the memory identified in the scanning.

12. The method of claim 11, wherein the transformed geometry data produced by each first core comprises:
a set of tile control lists, describing for each tile, the primitives processed by that first core that are present in that tile;
a head pointer for each tile control list, wherein the head pointer points to the start of the respective tile control list; and
one or more primitive blocks, containing data describing the primitives,
wherein the tile control lists contain pointers to the one or more primitive blocks.

13. The method of claim 11, wherein the scanning of the ALIST is performed:
(i) after completion of the partial render; and/or
(ii) after completion of at least some tiles of the partial render, optionally after completion of a predetermined number of rows of tiles.

14. The method of claim 11, further comprising:
allocating portions of the memory for storing the ALIST; and
following the scanning, compacting the ALIST, such that ALIST entries identified in the scan are invalidated and entries other than those identified in the scan are consolidated into a consecutive set of entries.

15. The method of claim 11, wherein the graphics rendering system uses at least one virtualised memory space, and the method comprises translating between virtual memory portions in the at least one virtualised memory space and physical memory portions of the memory,
the method further comprising:
allocating a hierarchical index, to index the physical memory portions associated with the virtual memory portions in the at least one virtualised memory space,
recording the portions of the memory allocated for the hierarchical index in an MMU list (MLIST);
wherein the MLIST comprises a plurality of entries, each entry being associated with a respective portion of the hierarchical index, wherein each entry includes an indication of the portion of virtual memory that is indexed by that portion of the hierarchical index;
wherein the method comprises, after scanning the ALIST:
identifying, from the MLIST, the portions of the memory associated with indexing virtual memory that has been fully consumed by the plurality of second cores performing fragment processing; and
freeing the identified portions of the memory.

16. The method of claim 15, further comprising, after freeing the identified portions of the memory, compacting the MLIST such that MLIST entries corresponding to the freed portions of the memory are invalidated, and the remaining MLIST entries are consolidated into a consecutive set of entries.

17. A graphics processing system comprising the multicore graphics rendering system as set forth claim 1 and a memory.

18. A method of manufacturing a graphics processing system as set forth in claim 17 comprising inputting an integrated circuit definition dataset to an integrated circuit manufacturing system, which when processed in said integrated circuit manufacturing system, configures the integrated circuit manufacturing system to manufacture the graphics processing system.

19. A non-transitory computer readable storage medium having stored thereon an integrated circuit definition dataset that, when processed in an integrated circuit manufacturing system, configures the integrated circuit manufacturing system to manufacture a graphics processing system as set forth in claim 17.

20. An integrated circuit manufacturing system configured to manufacture a graphics processing system as set forth in claim 17.

* * * * *